(12) United States Patent
Fujimura

(10) Patent No.: US 8,861,661 B2
(45) Date of Patent: Oct. 14, 2014

(54) INTERFERENCE WAVE SUPPRESSING APPARATUS, RELAY APPARATUS, RELAY SYSTEM, AND INTERFERENCE WAVE SUPPRESSING METHOD

(75) Inventor: Akinori Fujimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 15 days.

(21) Appl. No.: 13/580,738

(22) PCT Filed: Feb. 24, 2011

(86) PCT No.: PCT/JP2011/054171
§ 371 (c)(1),
(2), (4) Date: Aug. 23, 2012

(87) PCT Pub. No.: WO2011/105505
PCT Pub. Date: Sep. 1, 2011

(65) Prior Publication Data
US 2012/0314824 A1    Dec. 13, 2012

(30) Foreign Application Priority Data

Feb. 25, 2010  (JP) ................................. 2010-040774

(51) Int. Cl.
*H04B 1/00* (2006.01)
*H04B 7/155* (2006.01)
*H04B 1/10* (2006.01)

(52) U.S. Cl.
CPC .......... *H04B 1/1036* (2013.01); *H04B 7/15542* (2013.01)
USPC ........................................................ 375/349

(58) Field of Classification Search
USPC ........................... 375/260, 346, 234, 316, 334
See application file for complete search history.

(56) References Cited

U.S. PATENT DOCUMENTS

| 4,839,889 A | 6/1989 | Gockler |
| 6,014,366 A | 1/2000 | Ichiyoshi |

(Continued)

FOREIGN PATENT DOCUMENTS

| JP | 5 260235 | 10/1993 |
| JP | 9 284242 | 10/1997 |

(Continued)

OTHER PUBLICATIONS

Yamashita, F., et al., "A Proposal of Onboard Bandwidth-variable FFT Filter Banks and its Fundamental Characteristics," NTT Corporation, vol. J85-B, No. 12, pp. 2290-2299, (Dec. 2002) (with partial English translation).

(Continued)

*Primary Examiner* — Jaison Joseph
(74) *Attorney, Agent, or Firm* — Oblon, Spivak, McClelland, Maier & Neustadt, L.L.P.

(57) ABSTRACT

An interference wave suppressing apparatus includes a digital demultiplexing unit configured to demultiplex a reception signal into demultiplexed signals having predetermined bandwidth, an interference-wave detecting unit configured to determine, for each of the demultiplexed signals, based on a power value, whether an interference wave is present, an interference-wave suppressing unit configured to change a signal value of the demultiplexed signal, in which the interference-wave detecting unit determines that an interference wave is present, to a value equal to or smaller than a predetermined value, output the demultiplexed signal, and output the demultiplexed signal, in which the interference-wave detecting unit determines that an interference wave is absent, and a digital multiplexing unit configured to multiplex the signals output from the interference-wave suppressing unit.

22 Claims, 15 Drawing Sheets

(56) References Cited

U.S. PATENT DOCUMENTS

| | | | |
|---|---|---|---|
| 6,714,529 B1* | 3/2004 | Tanabe et al. | 370/343 |
| 6,819,911 B2* | 11/2004 | Clelland et al. | 455/296 |
| 6,987,989 B2 | 1/2006 | Hiramatsu et al. | |
| 7,076,168 B1* | 7/2006 | Shattil | 398/76 |
| 7,587,171 B2* | 9/2009 | Evans et al. | 455/63.1 |
| 7,894,556 B2* | 2/2011 | Casabona et al. | 375/346 |
| 8,238,410 B2* | 8/2012 | Lennen | 375/148 |
| 8,288,707 B2* | 10/2012 | Hauske et al. | 250/221 |
| 2002/0142725 A1* | 10/2002 | Clelland et al. | 455/63 |
| 2003/0128774 A1* | 7/2003 | Suzuki et al. | 375/316 |
| 2004/0091065 A1* | 5/2004 | Henttu | 375/317 |
| 2004/0228426 A1* | 11/2004 | Oh et al. | 375/346 |
| 2005/0259760 A1* | 11/2005 | Casabona et al. | 375/260 |
| 2006/0205346 A1* | 9/2006 | Evans et al. | 455/12.1 |
| 2007/0147525 A1* | 6/2007 | Song et al. | 375/260 |

FOREIGN PATENT DOCUMENTS

| | | |
|---|---|---|
| JP | 2001 51975 | 2/2001 |
| JP | 2001 111639 | 4/2001 |
| JP | 2001 267990 | 9/2001 |
| JP | 2002 354056 | 12/2002 |
| JP | 2003 8489 | 1/2003 |
| JP | 2003 124823 | 4/2003 |
| JP | 4094985 | 6/2008 |

OTHER PUBLICATIONS

International Search Report Issued Apr. 5, 2011 in PCT/JP11/54171 Filed Feb. 24, 2011.

Japanese Office Action Issued Apr. 30, 2013 in Patent Application No. 2012-501856 (with English translation).

Office Action issued May 28, 2014 in Canadian Patent Application No. 2,791,005.

* cited by examiner

FIG.13

| STAGE | FREQUENCY CONVERSION AND RECEPTION LOW-PASS FILTER UNIT | EXTRACTION AREA |
|---|---|---|
| 1 | 71-1 | (5), (6), (7), (8) |
| 1 | 71-2 | (1), (2), (3), (4) |
| 2 | 72-1 | (7), (8) |
| 2 | 72-2 | (5), (6) |
| 2 | 72-3 | (3), (4) |
| 2 | 72-4 | (1), (2) |
| 3 | 73-1 | (8) |
| 3 | 73-2 | (7) |
| 3 | 73-3 | (6) |
| 3 | 73-4 | (5) |
| 3 | 73-5 | (4) |
| 3 | 73-6 | (3) |
| 3 | 73-7 | (2) |
| 3 | 73-8 | (1) |

FIG.14

| STAGE | TRANSMISSION LOW-PASS FILTER FREQUENCY CONVERSION UNIT | ADDER | MULTIPLEXING TARGET AREA |
|---|---|---|---|
| | | 137 | (1), (2), (3), (4), (5), (6), (7), (8) |
| 1 | 136-1 | 135-1 | (5), (6), (7), (8) |
| | 136-2 | 135-2 | (1), (2), (3), (4) |
| 2 | 134-1 | 133-1 | (7), (8) |
| | 134-2 | 133-2 | (5), (6) |
| | 134-3 | 133-3 | (3), (4) |
| | 134-4 | 133-4 | (1), (2) |
| 3 | 132-1 | | (8) |
| | 132-2 | | (7) |
| | 132-3 | | (6) |
| | 132-4 | | (5) |
| | 132-5 | | (4) |
| | 132-6 | | (3) |
| | 132-7 | | (2) |
| | 132-8 | | (1) |

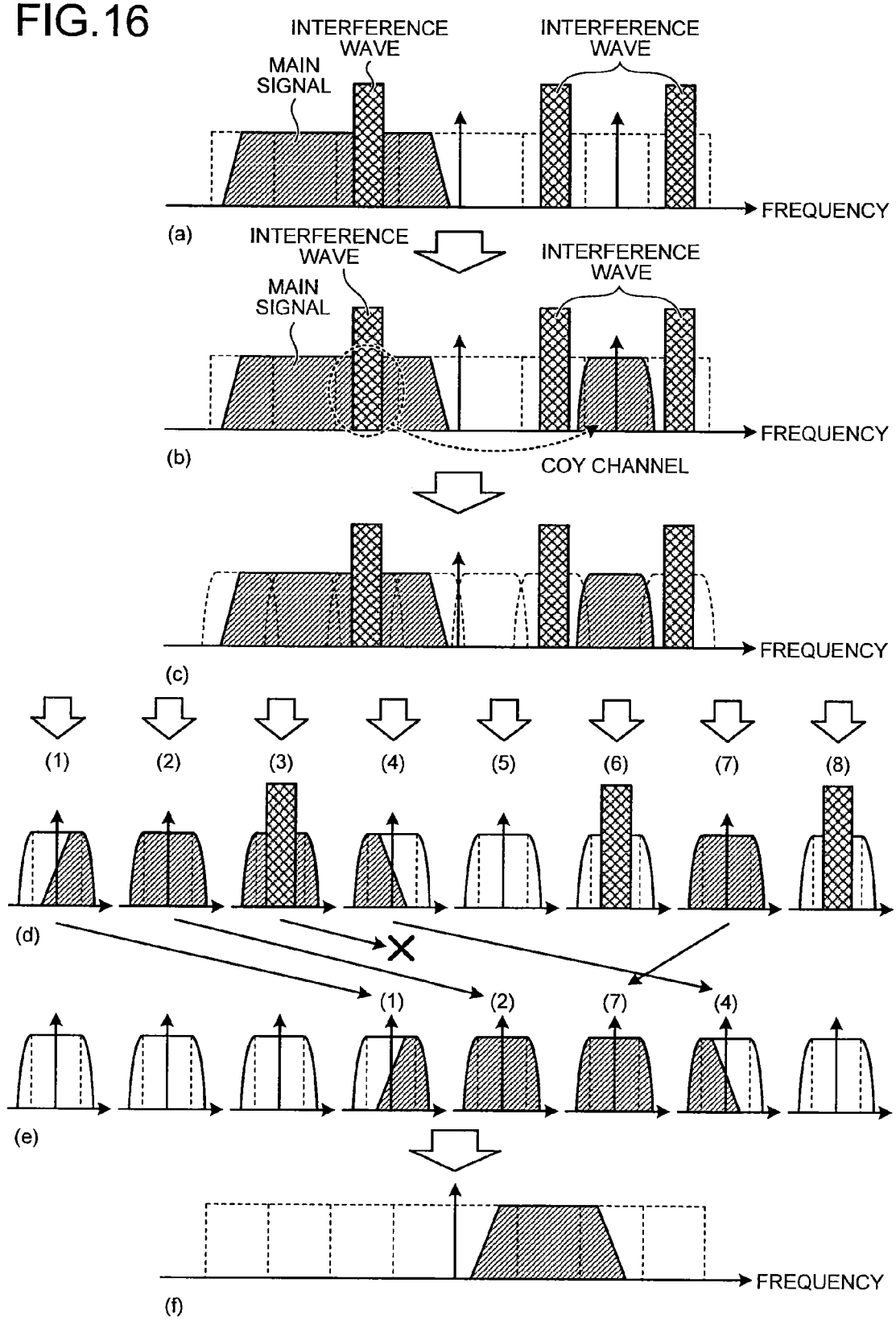

INTERFERENCE WAVE SUPPRESSING APPARATUS, RELAY APPARATUS, RELAY SYSTEM, AND INTERFERENCE WAVE SUPPRESSING METHOD

FIELD

The present invention relates to an interference wave suppressing apparatus, a relay apparatus, a relay system, and an interference wave suppressing method for suppressing an interference wave included in a reception signal.

BACKGROUND

In the past, a digital multiplexing apparatus and a digital demultiplexing apparatus adapted to multiple rates perform digital multiplexing and digital demultiplexing of signals in a variety of bandwidths by combining a sub-filter and Fourier transform (or fast Fourier transform (FFA)) means. A relay that relays band signals while arbitrarily changing the frequencies of the band signals in a satellite can be realized by combining the digital demultiplexing apparatus and the digital multiplexing apparatus.

Patent Literature 1, Patent Literature 2, and Non Patent Literature 1 disclose technologies concerning the digital multiplexing apparatus and the digital demultiplexing apparatus adapted to multiple rates.

CITATION LIST

Patent Literature

Patent Literature 1: Japanese Patent Application Laid-open No. 09-284242
Patent Literature 2: Japanese Patent Application Laid-open No. 2001-51975

Non Patent Literature

Non Patent Literature 1: Fumihiro Yamashita, Hiroshi Kazama, and Yoshinori Nakasuka, "Proposal and Basic Operation Characteristics of Satellite Mounted Bandwidth Variable FFT Filter Bank", The Institute of Electronics, Information and Communication Engineers Transaction B, Vol. J85-B, No. 12, pp. 2290-2299, December 2002

SUMMARY

Technical Problem

However, when digital demultiplexing and digital multiplexing of signals in a variety of bandwidths are performed in the related art, it is likely that an interference wave is added to a reception signal. On the other hand, Patent Literature 1, Patent Literature 2, and Non Patent Literature 1 do not describe a method of removing the interference wave. Therefore, there is a problem in that, when the interference wave is included in the reception signal, communication quality is deteriorated.

When the interference wave is included in the reception signal, the relay employing the related art relays the interference wave together with the reception signal. Therefore, there is a problem in that transmission power of the relay is wastefully consumed.

The present invention has been devised in view of the above and it is an object of the present invention to obtain an interference wave suppressing apparatus, a relay apparatus, a relay system, and an interference wave suppressing method that can secure communication quality even when an interference wave is added to a relay-target reception signal and suppress wasteful power consumption during relay.

Solution to Problem

An interference wave suppressing apparatus according to an aspect of the present invention includes: a demultiplexing unit configured to demultiplex a reception signal into demultiplexed signals having predetermined bandwidth; an interference-wave detecting unit configured to determine, for each of the demultiplexed signals, based on a power value of the demultiplexed signal, whether an interference wave is present; an interference-wave suppressing unit configured to change a signal value of the demultiplexed signal, in which the interference-wave detecting unit determines that an interference wave is present, to a value equal to or smaller than a predetermined value, output the demultiplexed signal after the change, and also output the demultiplexed signal, in which the interference-wave detecting unit determines that an interference wave is absent; and a multiplexing unit configured to output a multiplexed signal obtained by multiplexing signals output from the interference-wave suppressing unit.

Advantageous Effects of Invention

According to the present invention, interference suppression processing for demultiplexing a reception signal into a signal in each of channels of predetermined bandwidth and, when an average power value of the demultiplexed signal exceeds a predetermined threshold, changing the demultiplexed signal in the channel to a null signal is carried out. Therefore, there is an effect that, even when an interference wave is added to a relay-target reception signal, it is possible to secure communication quality and suppress wasteful power consumption during relay.

BRIEF DESCRIPTION OF DRAWINGS

FIG. 13 is a diagram of an example of extraction target areas of frequency conversion and reception low-pass filter units.

FIG. 14 is a diagram of an example of target areas to be multiplexed by the frequency conversion and reception low-pass filter units and adders.

FIG. 16 is a diagram of an example of interference suppression processing in a second embodiment.

DESCRIPTION OF EMBODIMENTS

Embodiments of an interference wave suppressing apparatus, a relay apparatus, a relay system, and an interference wave suppressing method according to the present invention are explained in detail below based on the drawings. The present invention is not limited by the embodiments.

First Embodiment

Figure 1:
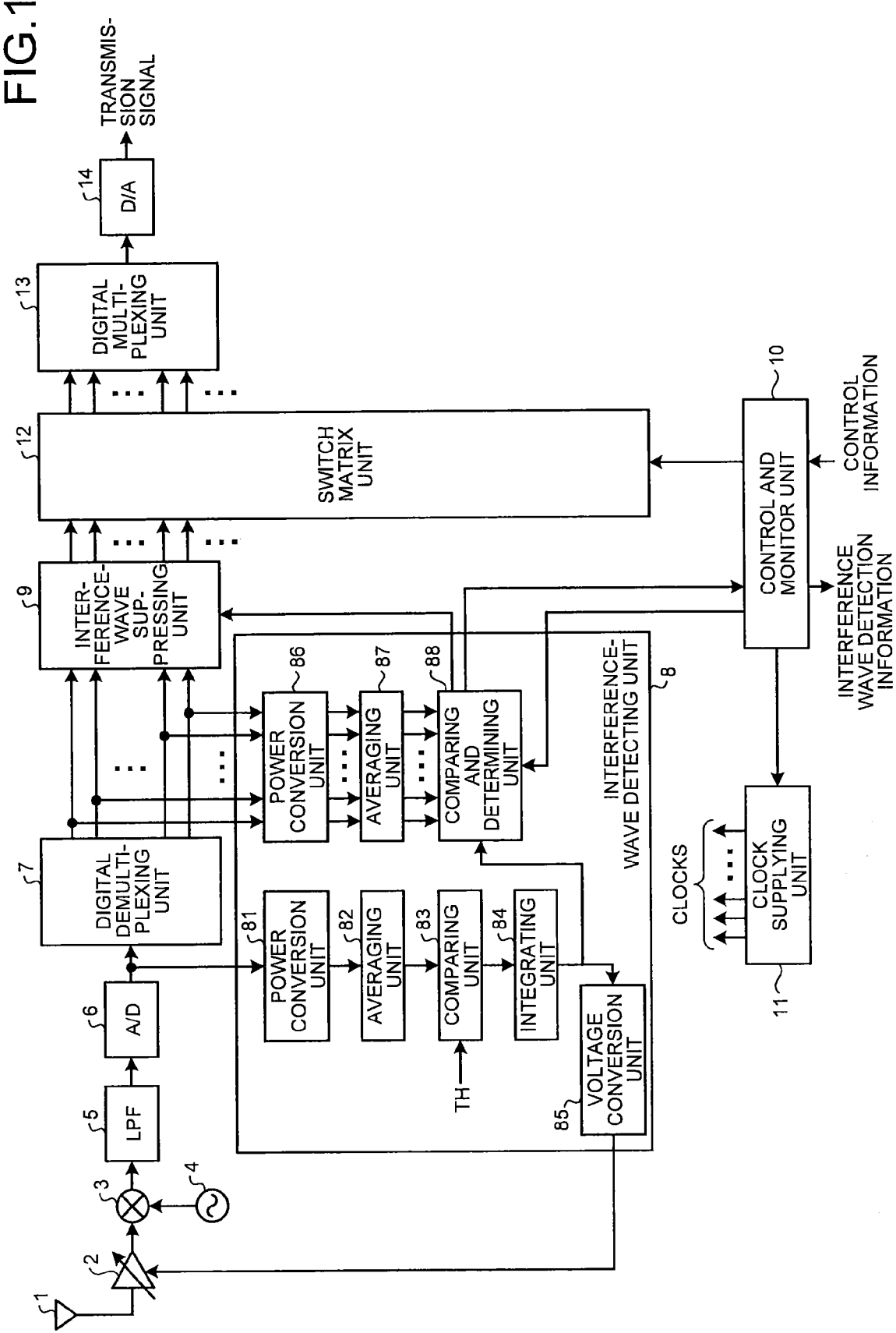
FIG. 1 is a diagram of a functional configuration example of a relay apparatus according to a first embodiment.

FIG. 1 is a diagram of a functional configuration example of a first embodiment of a relay apparatus according to the present invention. As shown in FIG. 1, the relay apparatus according to this embodiment includes an antenna 1, a voltage-controlled gain variable amplifier 2, a mixer 3, a local oscillator 4, an LPF (Low Pass Filter) 5, an A/D ((Analog)/(Digital)) converter (A/D) 6, a digital demultiplexing unit (demultiplexing means) 7, an interference-wave detecting unit 8, an interference-wave suppressing unit 9, a control and monitor unit 10, a clock supplying unit 11, a switch matrix unit 12, a digital multiplexing unit (multiplexing means) 13, and a D/A converter (D/A) 14.

The relay apparatus according to this embodiment includes a function of an interference wave suppressing apparatus that suppresses an interference wave included in a reception signal. The interference wave suppressing apparatus includes the digital demultiplexing unit 7, the interference-wave detecting unit 8, the interference-wave suppressing unit 9, and the digital multiplexing unit 13.

Figure 2:
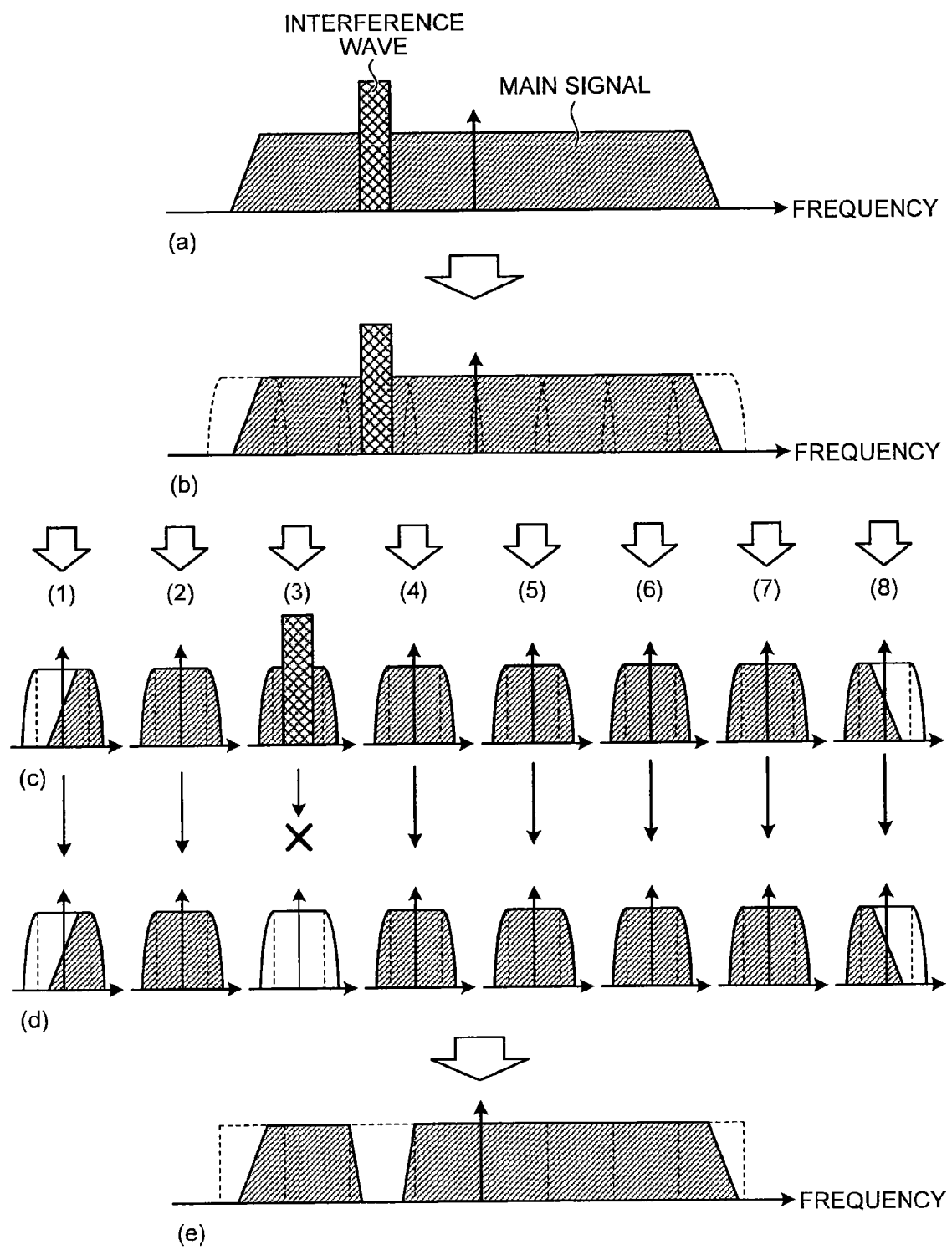
FIG. 2 is a diagram of an example of a processing procedure of interference wave removal in the first embodiment.

FIG. 2 is a diagram of an example of a processing procedure of interference wave removal in this embodiment. The operation in this embodiment is explained with reference to FIGS. 1 and 2. The antenna 1 receives a signal (a reception signal). The voltage-controlled gain variable amplifier 2 is an amplifying means. The voltage-controlled gain variable amplifier 2 amplifies the reception signal based on a gain set to a maximum in an initial state, adjusts the gain based on a control gain from the interference-wave detecting unit 8, and amplifies the reception signal based on the gain after the adjustment. The local oscillator 4 generates, as a local signal, a signal having a frequency (a local frequency) same as the center frequency of a main signal of the reception signal. It is assumed that the center frequency of the main signal of the reception signal is known. The mixer 3 multiples the reception signal with the local signal and converts the reception signal into a high frequency signal and a baseband frequency signal.

The LPF 5 allows a signal having a frequency corresponding to the signal converted into the baseband frequency of the signals converted by the mixer 3 to pass as a baseband signal and removes a high-frequency component. The LPF 5 removes the high-frequency component to prevent an alias component from being caused by sampling carried out by the A/D converter 6.

According to the series of processing, the signal received by the antenna 1 is amplified and converted into the baseband signal. The voltage-controlled gain variable amplifier 2 can be realized by a combination of an attenuation-amount variable attenuator and a fixed amplifier.

The A/D converter 6 applies analog-to-digital conversion to the baseband signal, which is an analog signal, and outputs dada sampled by the analog-to-digital conversion to the interference-wave detecting unit 8 and the digital demultiplexing unit 7 as baseband data.

Incidentally, the local frequency of the local oscillator 4 at the pre-stage can be changed to an intermediate frequency and the LPF 5 is changed to a band pass filter (BPF), which extracts a signal in a band of the intermediate frequency, such that an IF signal is input to the A/D converter 6 instead of the baseband signal. The A/D converter 6 can convert the IF signal into digital data according to A/D conversion.

In this case, a digital orthogonal detecting unit is provided right behind the A/D converter 6. The IF signal is converted into the baseband signal by the digital orthogonal detecting unit. Therefore, an increase in circuits and an increase in sampling speed of the A/D converter 6 are caused. However, on the other hand, an error that occurs in analog orthogonal detection such as an orthogonal error is eliminated by performing digital orthogonal detection. Stable reception performance and no adjustment can be attained. In this case, the digital orthogonal detecting unit is configured to input data to the interference-wave detecting unit 8 and the digital demultiplexing unit 7.

(a) of FIG. 2 is a diagram of an example of the baseband signal input to the digital demultiplexing unit 7.

The baseband signal includes a desired main signal and an interference wave. In FIG. 2, spectra of the main signal and the interference wave are shown. A trapezoidal spectrum of the main signal indicates a frequency characteristic of the desired main signal. A rectangular spectrum of the interference wave indicates a frequency characteristic of the interference wave. In the example shown in (a) of FIG. 2, the spectrum of the interference wave overlaps a part of a band of the spectrum of the main signal.

The digital demultiplexing unit 7 demultiplexes a signal (baseband data) input as "main signal +interference wave" illustrated in (a) of FIG. 2 into eight frequency bands (channels) shown in FIG. 2. Dotted lines shown in (b) of FIG. 2 indicate frequency characteristics of the eight channels for performing the demultiplexing. In this embodiment, an example in which a signal is demultiplexed into eight channels is explained. However, the number of demultiplexed channels is not limited to this. The number is a number corresponding to, for example, a channel configuration of a transmission signal.

In this case, the digital demultiplexing unit 7 can use, for example, the demultiplexing method employing the FFT described in Patent Literature 1 and Non Patent Literature 1. In this embodiment, a demultiplexing method employing a plurality of low-pass filters (half band filters) explained below is used. By using such a demultiplexing method, it is possible to also realize low power consumption corresponding to unused channels. In the case of both the demultiplexing methods, a frequency characteristic for extracting signals in the respective channels in the demultiplexing is set to have a characteristic that, as indicated by the frequency characteristics illustrated by the dotted lines in (b) of FIG. 2, channels are demultiplexed to have portions overlapping adjacent channels (while overlapping) in a frequency direction and a sum of both amplitude characteristics of areas overlapping the adjacent channel is 1. The frequency characteristics indicated by the dotted lines in (b) of FIG. 2 are an example. The frequency characteristics can be any frequency characteristics as long as the frequency characteristics satisfy the conditions explained above.

An example of spectra of eight signals ((1) to (8)) demultiplexed by the digital demultiplexing unit 7 is shown in (c) of FIG. 2. The interference-wave detecting unit 8 determines, concerning these eight demultiplexed signals, whether interference waves are present. Processing by the interference-wave detecting unit 8 is explained below.

As shown in FIG. 1, the interference-wave detecting unit 8 includes, as shown in FIG. 1, a power conversion unit 81, an averaging unit 82, a comparing unit 83, an integrating unit 84, a voltage conversion unit 85, a power conversion unit 86, an averaging unit 87, and a comparing and determining unit 88.

The power conversion unit 86 of the interference-wave detecting unit 8 calculates power values of the respective eight demultiplexed signals. The averaging unit 87 averages the power values calculated by the power conversion unit 86 and outputs an averaged power value as an average power value. The comparing and determining unit 88 compares the average power value of the channels calculated by the averaging unit 87 and a predetermined threshold (set for each of channels). As indicated by Formulas (1) and (2) below, when an average power value P(i) (i is a channel number, i=1, 2, 3, ..., and 8) for each of channels exceeds a threshold TH(i), the comparing and determining unit 88 determines that an interference signal is present. Otherwise, the comparing and determining unit 88 determines that an interference signal is absent. The comparing and determining unit 88 outputs a determination result to the interference-wave suppressing unit 9.

$$P(i) > TH(i): \text{determine that an interference wave is present} \quad (1)$$

$$P(i) \leq TH(i): \text{determine that an interference wave is absent} \quad (2)$$

As explained above, the digital demultiplexing unit 7 performs demultiplexing according to the frequency characteristic having the characteristic that channels overlap adjacent channels in a frequency direction and a sum of both amplitude characteristics of areas overlapping the adjacent channel is 1. Therefore, irrespective of in which position on a frequency axis in a frequency band an interference wave that the main signal could have is present (e.g., present between channels), the interference wave can be detected.

The threshold TH(i) is acquired, through the control and monitor unit 10, from another station that grasps channel allocation information (information concerning a signal of which channel is transmitted as a main signal). The other station that grasps this channel allocation information is equivalent to, for example, an earth station when the relay apparatus according to this embodiment is a relay apparatus mounted on a satellite. The other station is equivalent to a base station when the relay apparatus according to this embodiment is set on the ground.

In this embodiment, when the average power value P(i) exceeds the threshold TH(i), it is determined that an interference wave is present. However, a method of determination is not limited to this and any method can be used as long as it is determined based on signals of the channels whether an interference wave is present. The method can be, for example, a method of determining that, when a power value exceeds the threshold at least once, an interference wave is present or a method of calculating a statistic (dispersion, etc.) other than an average of power values and determining based on the statistic whether an interference wave is present.

The other station that grasps the channel allocation information (hereinafter referred to as control station) is a transmission source of a reception signal of the relay apparatus according to this embodiment. The control station can predict signal reception power in a channel unit in the relay apparatus according to this embodiment in the case of absence of an interference signal. Therefore, the other station that grasps the channel allocation information sets the threshold TH(i) based on the signal reception power in a channel unit. The threshold TH(i) is set to, for example, values respectively several decibels to more than ten decibels higher than predicted values of the signal reception power in a channel unit.

The interference-wave detecting unit 8 notifies the control station of, as interference wave detection information, the calculated average power value P(i) and a determination result concerning whether an interference wave in each of channels is present through the control and monitor unit 10 using a line separate from a line through which the main signal is transmitted.

When a strong interference wave exceeding an input amplitude range of the A/D converter 6 is mixed, subsequent all kinds of digital signal processing including processing by the digital demultiplexing unit 7 cannot be normally performed. Therefore, when the interference-wave detecting unit 8 detects a signal exceeding the input amplitude range of the A/D converter 6, by controlling the voltage-controlled gain variable amplifier 2 to reduce a gain, the interference-wave detecting unit 8 performs feedback control to always suppress a reception signal within the input amplitude range of the A/D converter 6.

Specifically, the power conversion unit 81 of the interference-wave detecting unit 8 converts baseband data input from the A/D converter 6 into power values. The averaging unit 82 calculates an average of the power values (an average power value). The comparing unit 83 compares an average power value Pa calculated by the averaging unit 82 and a predetermined threshold THa. When the average power value Pa exceeds THa, the comparing unit 83 sets a control value C, which is used for reducing the gain of the voltage-controlled gain variable amplifier 2, to a predetermined positive value. For example, when the average power value Pa exceeds THa, the comparing unit 83 sets the control value C to 1 (dB). The integrating unit 84 integrates the control value C and sets an integrated value of the control value C as a control gain G. The voltage conversion unit 85 converts the control gain G into a voltage and outputs the voltage to the voltage-controlled gain variable amplifier 2.

Unless a reception signal exceeds the input amplitude range of the A/D converter 6, the control value C is 0 and the control gain G is 0 decibel. However, when the reception signal exceeds the input amplitude range, the control value C starts to have a positive value. As a result, while the average power value Pa exceeds THa, the control gain G increases to 1 decibel, 2 decibels, and so one. According to the control gain converted into the voltage by the voltage conversion unit 85, the gain of the voltage-controlled gain variable amplifier 2 is reduced until the gain fits in the input amplitude range of the A/D converter 6.

When the interference wave disappears and the reception signal fits within the input amplitude range of the A/D converter 6 again, it is necessary to increase the gain of the voltage-controlled gain variable amplifier 2. Therefore, when the average power value Pa falls below THa, the comparing unit 83 sets the control value C to a negative value (e.g., −1 (dB)). When the control gain is a negative value, the comparing unit 83 increases the gain of the voltage-controlled gain variable amplifier 2. As a result, while the average power value Pa is lower than the THa, the control gain G for increasing the gain of the voltage-controlled gain variable amplifier 2 falls to . . ., 2 decibels, and 1 decibel and finally decreases to 0 decibel, which is an initial state.

According to such an automatic gain control loop, even when an excess input occurs because of a strong interference wave, it is possible to fit an input level within the input amplitude range of the A/D converter 6 and normally perform digital signal processing at a post stage. The power conversion unit 81, the averaging unit 82, the comparing unit 83, the integrating unit 84, and the voltage conversion unit 85 for performing automatic gain control can be provided as an automatic gain control unit separate from the interference-wave detecting unit 8. The automatic gain control is not essential. For example, when there is another unit that makes it possible to normally perform the digital signal processing, the automatic gain control does not have to be carried out. In this case, the interference-wave detecting unit 8 does not need to include the power conversion unit 81, the averaging unit 82, the comparing unit 83, the integrating unit 84, and the voltage conversion unit 85.

The control gain G output from the integrating unit 84 is output to the comparing and determining unit 88 as well. When the control gain G indicates a value other than 0 decibel, the comparing and determining unit 88 determines that processing on a reception side is in an excess input state. When the comparing and determining unit 88 determines that the processing on the reception side is in the excess input state, the comparing and determining unit 88 includes a result of the determination or a value itself of the control gain G in the interference wave detection information and notifies the control station of the determination result or the control gain G through the control and monitor unit 10. The notification of the determination result or the control gain G is not essential. For example, the notification is necessary when the control station changes a transmission method (a modulation method, etc.) of the main signal using these kinds of information as explained below.

The control station can carry out adaptive coding and modulation based on the information concerning the control gain G notified from the relay apparatus according to this embodiment. When the value of the control gain G is X [dB], this means that reception power at an input end of the relay apparatus falls X [dB]. Therefore, it is likely that a communication line cannot be established because of a fall in an S/N (Signal to Noise) ratio.

Therefore, the control station allows a fall in transmission speed and changes a modulation system for the main signal to a code modulation system that is established even at a low S/N ratio according to the information concerning the control gain G.

For example, when the modulation system is PSK (Phase Shift Keying) modulation, modulation is sequentially changed to 16QAM (Quadrature Amplitude Modulation), QPSK (Quadrature Phase Shift Keying), and BPSK (Binary Phase Shift Keying). In the case of spread spectrum modulation, spread code length is sequentially changed to 128 chips 256 chips, and 512 chips. According to such adaptive coding and modulation, although the transmission speed falls, even when a strong interference wave is received, it is possible to establish a communication line.

Next, the operation of the interference-wave suppressing unit 9 is explained. The interference-wave suppressing unit 9 outputs, to the switch matrix unit 12 at a post stage, signals excluding a signal of a channel in which it is determined that an interference wave is present based on a determination result received from the interference-wave detecting unit 8 among signals in the respective channels output from the digital demultiplexing unit 7. Concerning a channel in which it is determined that an interference wave is present, the interference-wave suppressing unit 9 outputs a null signal (a signal in which all of I and Q are 0). In the example shown in FIG. 2, because an interference wave is present in a channel corresponding to (3) of (c) in FIG. 2, the interference-wave detecting unit 8 detects the interference wave in the channel corresponding to (3). In this case, as shown in (d) of FIG. 2, the interference-wave suppressing unit 9 outputs a signal (a painted-out area in (d) of FIG. 2) excluding the signal in the channel corresponding to (3) to the switch matrix unit 12.

Concerning the channel in which it is determined that an interference wave is present, instead of outputting the null signal, the interference-wave suppressing unit 9 can perform processing for limiting the amplitude of the signal in the channel to be smaller than the threshold TH(i).

The switch matrix unit 12 is necessary when two or more areas at a relay destination are present or when two or more areas at a relay source are present. For example, the switch matrix unit 12 is necessary when a part of a reception signal received from an area A is relayed to an area B and another part of the reception signal is relayed to an area C or when, conversely, both of a reception signal received from the area B and a reception signal received from the area C are relayed to the area A.

The relay apparatus according to this embodiment includes the digital multiplexing unit 13 for each of areas at a relay destination (although only one digital multiplexing unit 13 is shown in FIG. 1, the digital multiplexing unit 13 is provided for each of the areas at the relay destination. Alternatively, the one digital multiplexing unit 13 performs processing for each of relay destinations in a time division manner). The switch matrix unit 12 rearranges demultiplexed signals for each of the relay destinations and outputs the demultiplexed signals to the digital multiplexing units 13 corresponding to relay destinations respectively corresponding to the signals. When each of the relay destination and the relay source is one area, it is unnecessary to provide the switch matrix unit 12. The digital multiplexing unit 13 only has to be one. When two or more relay sources are present, a digital demultiplexing unit is provided for each of relay sources.

An example of a signal multiplexed by the digital multiplexing unit 13 is shown in (e) of FIG. 2. In (e) of FIG. 2, an example in which an area at the relay destination is one is shown. As explained above, in the example shown in FIG. 2, an area at the relay source is also one. Therefore, in the example shown in FIG. 2, the switch matrix unit 12 is not essential and the digital multiplexing unit 13 can be one.

The digital multiplexing unit 13 multiplexes the demultiplexed signals in the channels and generates a signal after interference wave removal as shown in (e) of FIG. 2. Finally, the D/A converter 14 subjects a signal (digital data) after the interference wave removal output from the digital multiplexing unit 13 to digital-to-analog conversion and outputs the signal as a transmission signal. When a plurality of areas at the relay destination are present, the digital multiplexing unit 13 corresponding to each of the areas at the relay destination multiplexes the demultiplexed signals in the channels and generates a signal after interference wave removal.

Like the digital demultiplexing unit 7, the digital multiplexing unit 13 according to this embodiment can use the multiplexing method employing FFT described in Patent Literature 1 and Non Patent Literature 1. However, it is possible to also realize low power consumption corresponding to unused channels by using a multiplexing method employing a plurality of low-pass filter (half band filters) explained below.

In both the multiplexing methods, as illustrated by the dotted lines in (b) of FIG. 2, channels are multiplexed while overlapping adjacent channels in a frequency direction and are multiplexed such that a sum of both amplitude characteristics of areas where two frequency characteristics overlap is 1. Frequency characteristics of the channels in performing the multiplexing are the same as frequency characteristics of the channels in performing the demultiplexing. By using the same frequency characteristics in the demultiplexing and the multiplexing, even after a signal is demultiplexed into a plurality of channels, it is possible to restore the original signal according to the multiplexing.

The clock supplying unit 11 shown in FIG. 1 supplies an operation clock for respective components in the digital demultiplexing unit 7 and the digital multiplexing unit 13 to operate. When a demultiplexing and multiplexing method employing a plurality of low-pass filters (half band filters) is used, the clock supplying unit 11 supplies clocks to the components based on a clock control signal. The clock control signal is explained below.

According to the operation in this embodiment explained above, it is possible to generate a transmission signal with an interference wave suppressed. For example, in the case of conditions explained below, unless an interference wave is suppressed, a ratio (−30 decibels) of reception power and interference power is set off against a diffusion gain of 30 decibels. An S/N after inverse diffusion decreases to 0 decibel and communication quality is markedly deteriorated.

Conditions

Modulation method: spread spectrum modulation

Bandwidth of an interference wave: Bandwidth of a principal wave=1:20

Channel width after demultiplexing: Bandwidth of the principal wave=1:20

Reception power: Interference wave power=1:1000 (→−30 decibels)

Diffusion gain: 30 decibels

On the other hand, when the interference suppression processing in this embodiment is carried out, according to interference wave removal, the influence due to inverse diffusion of an interference wave is eliminated and the diffusion gain only falls to 19/20 times (−0.22 decibel). Therefore, it is possible to secure a satisfactory communication quality (sensitivity deterioration: only −0.22 decibel). The relay apparatus according to this embodiment relays a signal from which an interference wave is removed. Therefore, it is possible to suppress wasteful transmission power caused by relaying the signal including the interference wave.

Next, a digital demultiplexing method and a digital multiplexing method according to this embodiment are explained. In this embodiment, the demultiplexing and multiplexing method employing a plurality of low-pass filters (half band filters) is used to realize low power consumption corresponding to unused channels.

Figure 3:
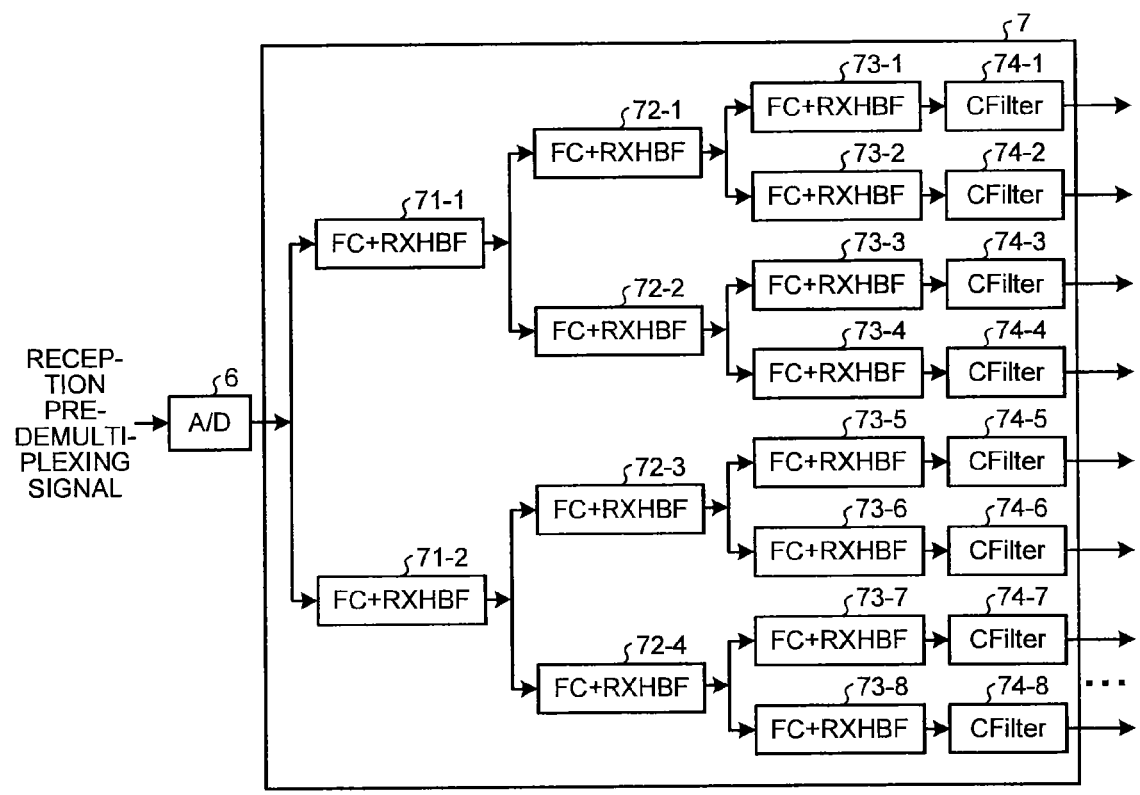
FIG. 3 is a diagram of a functional configuration example of a digital demultiplexing unit in which a plurality of low-pass filters are used.

FIG. 3 is a diagram of a functional configuration example of the digital demultiplexing unit 7 employing a plurality of low-pass filters (half band filters). In this embodiment, the digital demultiplexing unit 7 includes three stages. When the number of stages is represented as stage (=1, 2, 3, . . . ), a maximum demultiplexing number can be represented as $2^{stage}$. The number of stages only has to be appropriately set based on the maximum demultiplexing number.

In the configuration shown in FIG. 3, because stage=3, demultiplexing of maximum eight (=$2^3$) waves is realized. In this embodiment, the case of stage=3 is explained. Even in the case of stage=4 or more, the operation in this embodiment can be applied if the operation of the stages is carried out in the same manner as the operation in this embodiment.

As shown in FIG. 3, the digital demultiplexing unit 7 includes frequency conversion and reception low-pass filter units (FC (Frequency Converter)+RXHBF (Receiver Half Band Filter): a frequency conversion filter units) 71-1, 71-2, 72-1 to 72-4, and 73-1 to 73-8 that, after applying frequency conversion and low-pass filtering processing, reduce a sampling rate of data after the processing to a half of input data speed and then output the data and reception channel filter units (CFilter (Channel Filter)) 74-1 to 74-8 that apply filtering processing to output signals from the frequency conversion and reception low-pass filter units 73-1 to 73-8.

In the configuration example shown in FIG. 3, as explained above, stage=3, the two frequency conversion and reception low-pass filter units 71-1 and 71-2 configure a first stage, the frequency conversion and reception low-pass filter units 72-1 to 72-4 configure a second stage, and the frequency conversion and reception low-pass filter units 73-1 to 73-8 configure a third stage. As shown in FIG. 3, the frequency conversion and reception low-pass filter units 71-1 and 71-2 in the first stage process signals respectively input to the filter units and then output the signals to corresponding two of the frequency conversion and reception low-pass filter units 72-1 to 72-4 in the second stage connected to each of the frequency conversion and reception low-pass filter units 71-1 and 71-2. Similarly, the frequency conversion and reception low-pass filter units 72-1 to 72-4 in the second stage process signals respectively input to the filter units and then output the signals to corresponding two of the frequency conversion and reception low-pass filter units 73-1 to 73-8 in the third stage connected to each of the frequency conversion and reception low-pass filter units 72-1 and 72-4.

When the number of stage is four, sixteen frequency conversion and reception low-pass filter units are provided and sixteen reception channel filter units are provided after the third stage. In this way, outputs of the frequency conversion and reception low-pass filter units in each number of stages are output to two of the frequency conversion and reception low-pass filter units in the next stage. Therefore, every time the number of stages increases by 1, frequency conversion and reception low-pass filters twice as many as the number of stages are increased. The reception channel filter units are provided by the number of frequency conversion and reception low-pass filter units in the last stage.

Figure 4:
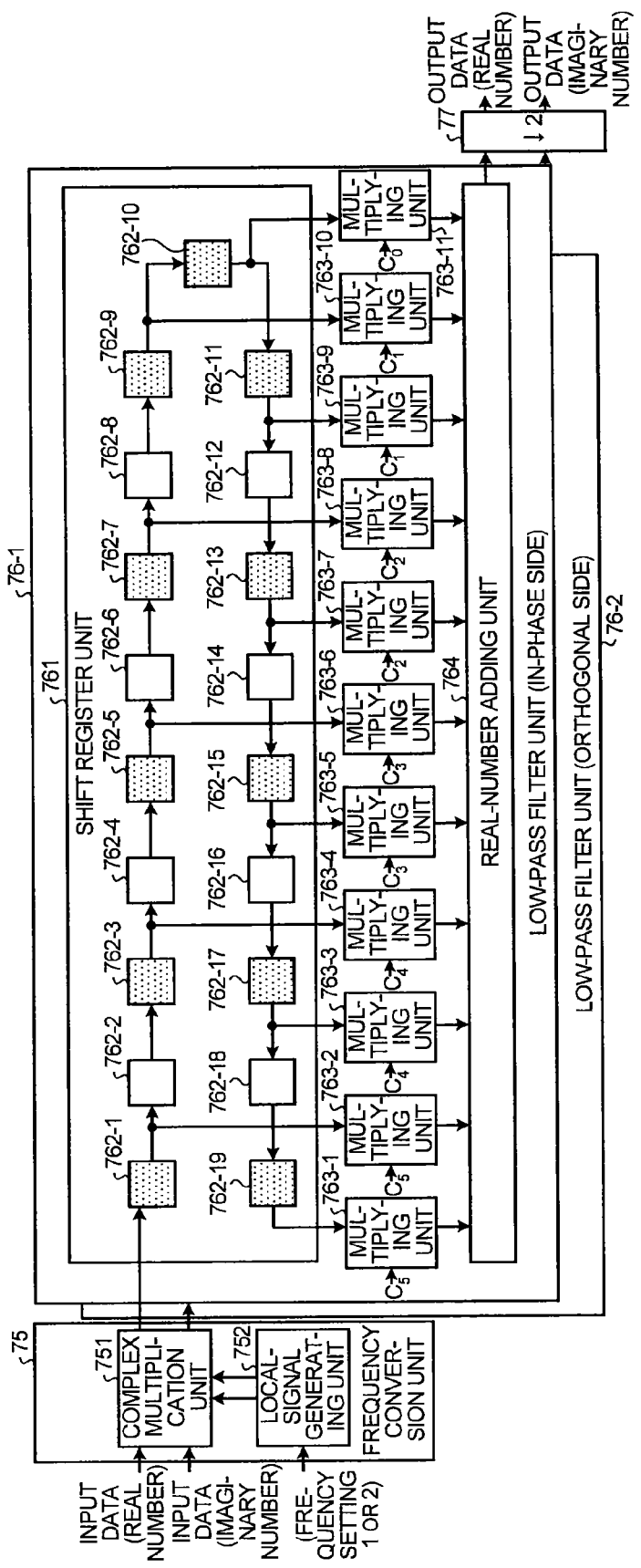
FIG. 4 is a diagram of a functional configuration example of a frequency conversion and reception low-pass filter unit.

FIG. 4 is a diagram of a functional configuration example of the frequency conversion and reception low-pass filter unit 71-1. The frequency conversion and reception low-pass filter units 71-2, 72-1 to 72-4, and 73-1 to 73-8 have the same configuration as the frequency conversion and reception low-pass filter unit 71-1. In the configuration example shown in FIG. 4, the number of taps of a filter is set to nineteen. As shown in FIG. 4, the frequency conversion and reception low-pass filter unit 71-1 includes a frequency conversion unit 75 that realizes arbitrary (free) frequency offset according to setting from the outside, low-pass filter units 76-1 and 76-2, and a down-sampler unit (↓2) 77 that curtails output data of the low-pass filter units 76-1 and 76-2 to a half (that is, curtailing the data every twice and discarding the rest).

The low-pass filter unit 76-1 performs processing on an in-phase side. The low-pass filter unit 76-2 performs processing on an orthogonal side.

The frequency conversion unit 75 includes a complex multiplication unit 751 and a local-signal generating unit 752. Each of the low-pass filter units 76-1 and 76-2 includes a shift register unit 761, multiplying units 763-1 to 763-11, and a real-number adding unit 764. The shift register unit 761 includes registers 762-1 to 762-19. The low-pass filter units 76-1 and 76-2 can include half band filters with a reduced circuit size (number of multipliers).

In FIG. 4, the number of taps is nineteen.

However, the number of taps of a filter is not limited to this and can be any value as long as the value is appropriately set according to conditions of the relay apparatus. When the number of taps is other than nineteen, the number of registers of the shift register unit 761 and the number of multiplying units only have to be changed according to the number of taps.

Processing by the frequency conversion and reception low-pass filter unit 71-1 is explained. The processing by the frequency conversion and reception low-pass filter units 71-2, 72-1 to 72-4, and 73-1 to 73-8 is the same as the processing by the frequency conversion and reception low-pass filter unit 71-1.

Figure 5:
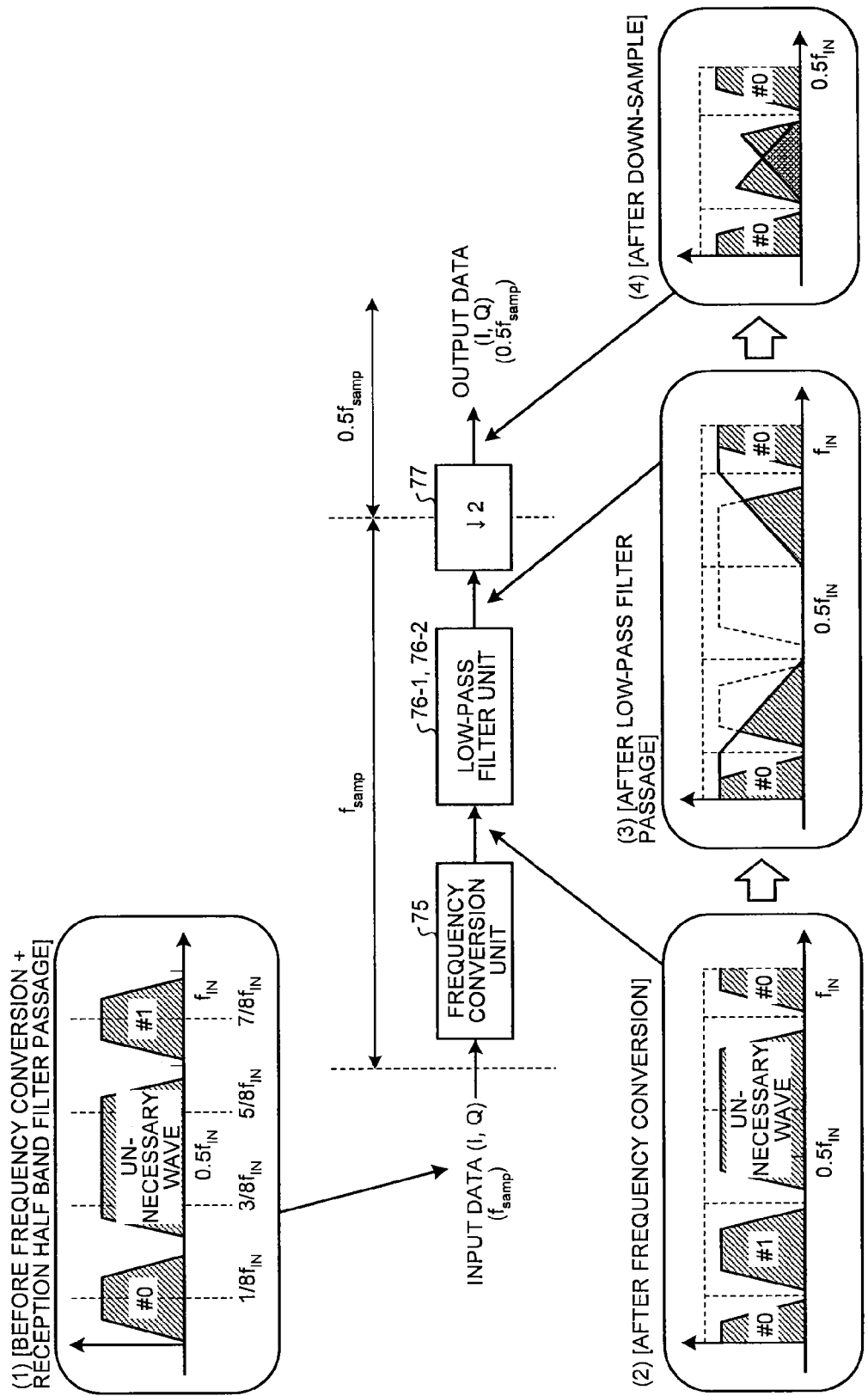
FIG. 5 is a diagram of an example of processing by the frequency conversion and reception low-pass filter unit.

FIG. 5 is a diagram of an example of processing by the frequency conversion and reception low-pass filter unit 71-1. The frequency conversion and reception low-pass filter unit 71-1 applies, to an input signal sampled at a sampling frequency $f_{samp}$, down-convert for reducing the center frequency of a partial band (hereinafter referred to as extraction band) of a band (bandwidth $f_{IN}$: $f_{IN}=f_{samp}/2$) of the input signal to zero and extracts the extraction band from the down-converted signal using a low-pass filter.

For example, as shown in (1) of FIG. 5, it is assumed that three signal spectra (a signal #0, an unnecessary wave, and a signal #1) are present in the input signal band. When the signal #0 (a center band 0.125 (1/8) $f_{IN}$) is set as the extraction band, the frequency conversion unit 75 performs frequency conversion to shift a frequency by −0.125 $f_{IN}$. It is assumed that a shift amount in performing the frequency conversion is set according to the extraction band.

The frequency conversion unit 75 converts the center frequency of the signal #0 into zero ((2) of FIG. 5) by shifting the frequency by −0.125 $f_{IN}$. Similarly, when the signal #1 is set as the extraction band, the frequency conversion unit 75 can convert the center frequency of the signal #1 to zero by shifting the frequency by +0.125 $f_{IN}$.

When the signal #0 is set as the extraction band, concerning I (in-phase) and Q (orthogonal) components, the low-pass filter units 76-1 and 76-2 respectively allow the signal #0 after the frequency conversion processing and remove at least a part of signal components in an area of 0.25 $f_{IN}$ to 0.75 $f_{IN}$ ((3) of FIG. 5).

The down-sampler unit 77 curtails data passed through the low-pass filter units 76-1 and 76-2 to a half ((4) of FIG. 5). In this case, because a sampling frequency decreases to a half, a sampling theorem is not satisfied. Frequency components in a band of an area of 0.5 $f_{IN}$ to $f_{IN}$ of a signal before curtailing overlap frequency components in an area of 0.0 $f_{IN}$ to 0.5 $f_{IN}$ because of aliasing. However, because the signal components in the area of 0.25 $f_{IN}$ to 0.75 $f_{IN}$ are removed by the low-pass filter units 76-1 and 76-2 in advance, it is possible to prevent deterioration in an S/N ratio due to overlapping of an extraction target signal band and alias components.

In the example shown in (2) to (4) of FIGS. 5, the signal #0 is set as the extraction band. However, the signal #1 can be extracted as the extraction area in the same manner by converting the center frequency of the signal #1 into zero. In the frequency conversion and reception low-pass filter units 71-1 and 71-2, for example, in the example shown in FIG. 3, frequencies are respectively shifted by +0.125 $f_{IN}$ and −0.125 $f_{IN}$. As explained above, the low-pass filtering processing by the low-pass filter units 76-1 and 76-2 and down sampling processing by the down-sampler unit 77 are performed. Consequently, demultiplexed signals corresponding to the signal #0 and the signal #1 are respectively output from the frequency conversion and reception low-pass filter units 71-1 and 71-2.

Figure 6:
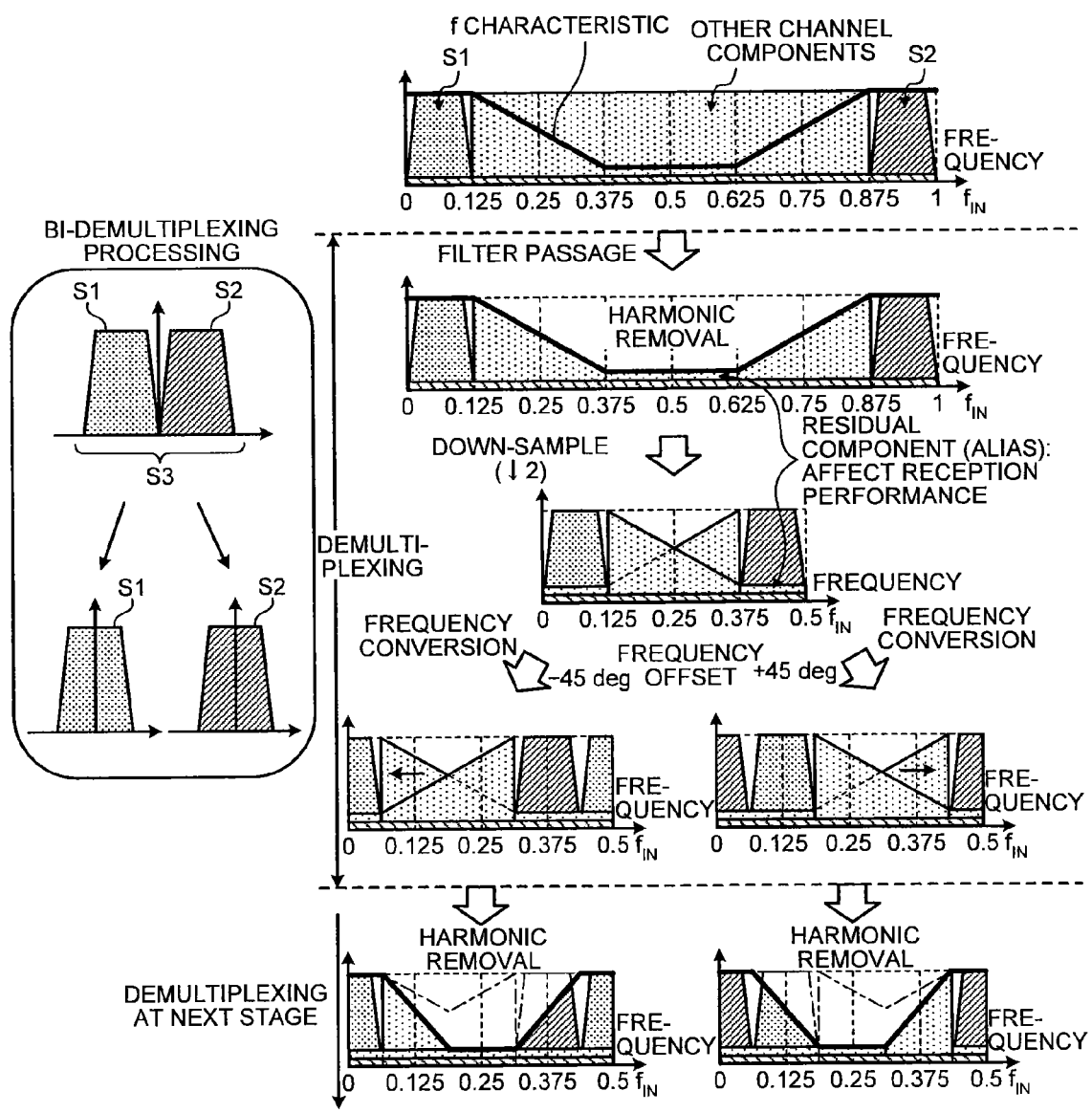
FIG. 6 is a diagram of an example of bi-demultiplexing processing on a frequency axis.

FIG. 6 is a diagram of an example of bi-demultiplexing processing on a frequency axis. In the demultiplexing processing in this embodiment, processing of "frequency conversion→low-pass filter→down-sample→frequency conversion→low-pass filter→down-sample→ . . . " is repeated until sampling speed after the down-sample increases to a double of minimum channel width (Fc) in which minimum signal bandwidth (bandwidth Bw) in a system for the processing fits. In a process of the processing, signals (2 Bw, 3 Bw, 4 Bw, etc.) having wide bandwidth can be dissolved into a plurality of signals. The demultiplexing processing itself performed once (in one cycle) is equivalent to the demultiplexing method in the past. Therefore, detailed explanation of the demultiplexing processing is omitted.

As shown in FIG. 6, a signal including a signal S1 and a signal S2 is represented as signal S3. Both the signals S1 and S2 are set to bandwidth of 0.125 $f_{IN}$. The signal S1 and the signal S2 are present on the left and right (in a plus direction and a minus direction) with respect to the center frequency of the signal S3. In a first stage of FIG. 6, a state in which the frequency conversion unit 75 performs frequency conversion to convert the center frequency of the signal S3 into zero is shown.

Subsequently, as shown in a second stage of FIG. 6, the low-pass filter units 76-1 and 76-2 perform filtering for allowing a band of the signal S3 to pass and removing a high-frequency component. As shown in a third stage of FIG. 6, the down-sampler unit 77 performs curtailment to a half.

Further, a signal curtailed to a half by the down-sampler unit 77 is input to the two frequency conversion and reception low-pass filter units in the next stage. For example, when it is assumed that the signal S1 and the signal S2 are signals in a minimum unit that should be finally demultiplexed, the next stage is processing at a final stage. Therefore, for example, it is assumed that processing in the frequency conversion and reception low-pass filter unit 72-1 is processing up to the third stage from the top in FIG. 6 and an output of the frequency conversion and reception low-pass filter unit 72-1 is output to the frequency conversion and reception low-pass filter unit 73-1 and the frequency conversion and reception low-pass filter unit 73-2. The frequency conversion unit 75 of the frequency conversion and reception low-pass filter unit 73-1 performs frequency conversion such that the center frequency of the signal S1 decreases to zero (in this example, shifts the center frequency by 0.125/2 $f_{IN}$ (+45 deg)). The frequency conversion unit 75 of the frequency conversion and reception low-pass filter unit 73-2 performs frequency conversion such that the center frequency of the signal S2 decreases to zero (in this example, shifts the center frequency by −0.125/2 $f_{IN}$ (−45 deg)).

The low-pass filter units 76-1 and 76-2 of the frequency conversion and reception low-pass filter units 73-1 and 73-2 perform filtering as demultiplexing processing at the next stage. Thereafter, similarly, the down-sampler unit 77 performs curtailment processing and an output signal after the curtailment processing is output to the reception channel filter units 74-1 and 74-2 (if a stage is not the final stage, output to the two frequency conversion and reception low-pass filter units in the next stage).

In FIG. 6, to clearly show, as a concept, a state in which demultiplexing is repeatedly performed, it is assumed that the demultiplexing is performed (e.g., the signal S3 is demultiplexed into the signal S1 and the signal S2) at a point when frequency conversion is performed. Low-pass filter→downsample→and frequency conversion is set as demultiplexing processing at one stage. Therefore, one demultiplexing processing (processing at one stage) shown in FIG. 6 does not correspond to processing by one frequency conversion and reception low-pass filer unit. However, the position of a break of the first stage can be changed and frequency conversion→low-pass filter→down-sample can be set as demultiplexing processing at one stage to correspond to processing by the one frequency conversion and reception low-pass filter unit. The break of the demultiplexing processing at the first stage can be set anywhere.

The operation of the reception channel filter units 74-1 to 74-8 is explained. The reception channel filter unit 74-i (i=1, 2, . . ., and 8) extracts a signal in a band set as an extraction target by the own reception channel filter unit 74-i from a signal output from the frequency conversion and reception low-pass filter unit 73-i at the final stage while performing waveform shaping based on a predetermined frequency characteristic. For example, when bandwidth of demultiplexing target signals (in the case of FIG. 6, the signal S1 and the signal S2) is represented as Bw as shown in the bottom stage of FIG. 6, the signal output from the frequency conversion and reception low-pass filter unit 73-i at the final stage includes signals on both sides of 0 in the center by 0.5 Bw on each of both sides (a minus frequency component is present in a position where $0.5\, f_{IN}$ is set to 0).

Figure 7:
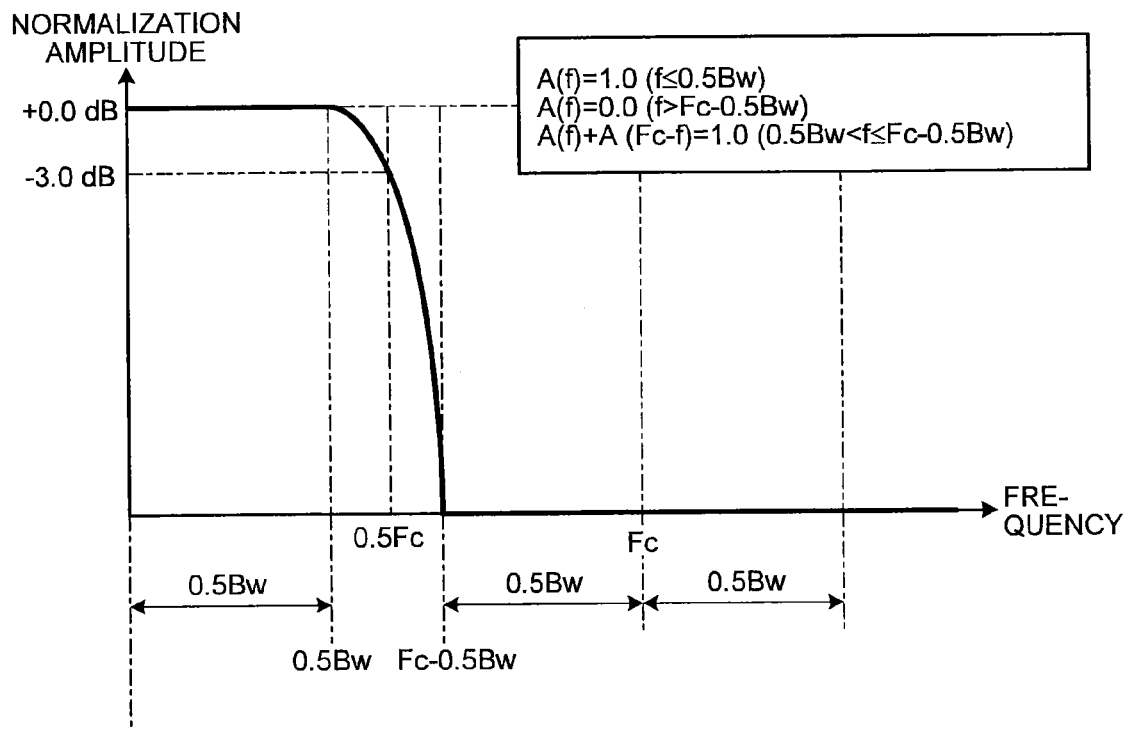
FIG. 7 is a diagram of an example of a frequency characteristic of a channel filter.

FIG. 7 is a diagram of an example of a frequency characteristic of a filter (a channel filter) used by the reception channel filter unit 74-i in extracting a signal. A frequency characteristic (A(f) (f is a frequency)) with respect to amplitude required of the channel filter has a characteristic that a sum of a characteristic (A(Fc-f)) obtained by aliasing the frequency characteristic A(f) from the center frequency Fc and the frequency characteristic (A(f)) itself is fixed.

In FIG. 7, as an example, a filter that satisfies Formulas (3) to (5) below as the amplitude to frequency characteristic (A(f)) of the channel filter that satisfies such a requirement is shown.

$$A(f)=1.0\ (f\leq 0.5\ Bw) \quad (3)$$

$$A(f)=0.0\ (f>Fc-0.5\ Bw) \quad (4)$$

$$A(f)+A(Fc-f)=1.0\ (0.5\ Bw<f\leq Fc-0.5\ Bw) \quad (5)$$

As shown in FIG. 7, at f=0.5 Fc, A(f) is set to 0.5 (−3.0 dB)). As a filter that satisfies such a frequency characteristic, for example, there is a full Nyquist filter. Sampling speed of the filter is a double of Fc. The channel filter can include a half band filter having a small circuit size.

A target wave is extracted using the channel filter that satisfying the characteristic while being waveform-shaped. Consequently, when the wideband signals (2 Bw, 3 Bw, 4 Bw, etc.) demultiplexed into a plurality of signals in the process explained above are multiplexed again, the original wideband signals can be restored without distortion of a waveform and a spectrum.

Figure 8:
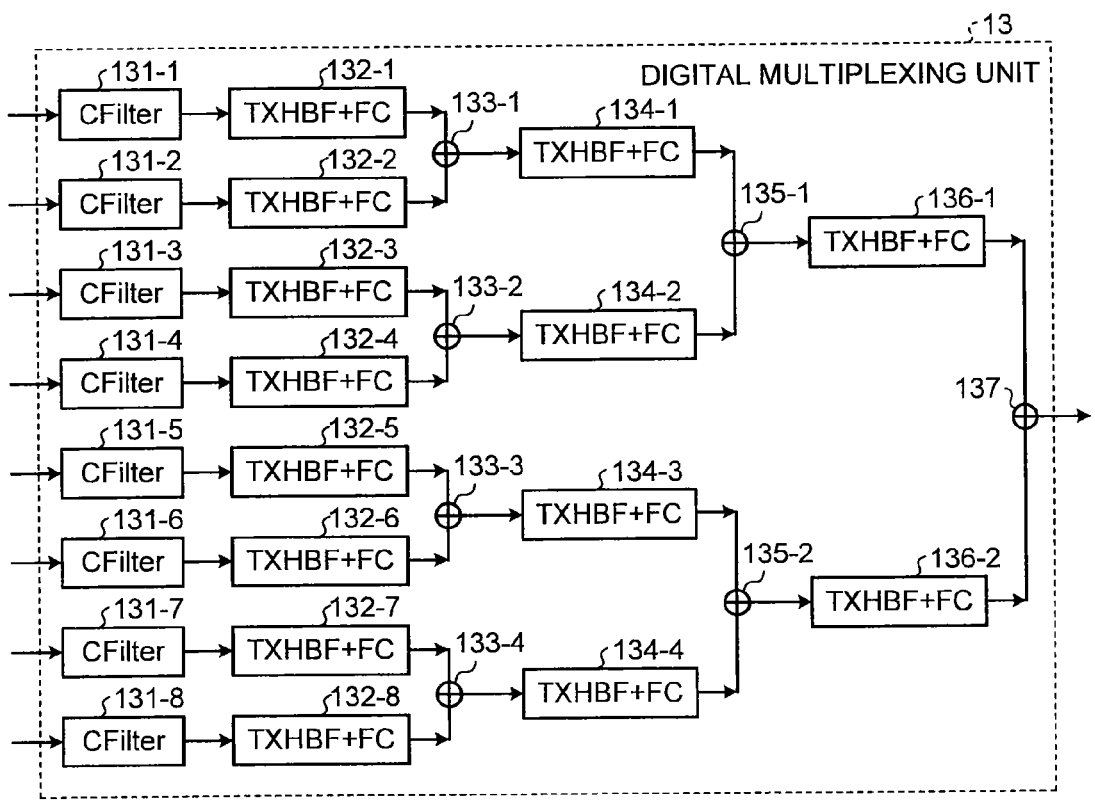
FIG. 8 is a diagram of a functional configuration example of a digital multiplexing unit.

The operation of the digital multiplexing unit 13 according to this embodiment is explained. FIG. 8 is a diagram of a functional configuration example of the digital multiplexing unit 13. Like the digital demultiplexing unit 7, the digital multiplexing unit 13 includes three stages (stage=3) and realizes multiplexing of maximum eight (=$2^3$) waves. A multiplexing method in this embodiment can also be applied when the number of stages is 4 or more.

The digital multiplexing unit 13 includes transmission channel filter units (CFilter) 131-1 to 131-8 that apply filtering processing to input signals, transmission low-pass filer frequency conversion units (TXHBF (Transceiver HBF)+FC: filter-frequency conversion units) 132-1 to 132-8, 134-1 to 134-4, and 136-1 and 136-2 that, after interpolating a sampling rate to a double of input data speed, frequency-convert and output the input signals, and adders 133-1 to 133-4, 135-1, 135-2, and 137.

In the multiplexing processing, the stages are a first stage, a second stage, and a third stage from a side close to the D/A converter 14 (a downstream side). Specifically, the transmission low-pass filter frequency conversion units 136-1 and 136-2 configure the first stage, the transmission low-pass filter frequency conversion units 134-1 to 134-4 configure the second stage, and the transmission low-pass filer frequency conversion units 132-1 to 132-8 configure the third stage.

The adder 133-1 adds up an output from the transmission low-pass filter frequency conversion unit 132-1 (the third stage) and an output from the transmission low-pass filter frequency conversion unit 132-2 and outputs an addition result to the transmission low-pass filter frequency conversion unit 134-1 (the second stage). Similarly, the adders 133-2 to 133-4 add up outputs from two transmission low-pass filter frequency conversion units at the third stage to which each of the adders is connected and output addition results to the transmission low-pass filter frequency conversion units at the second stage to which the adders 133-2 to 133-4 are connected.

Similarly, the adders 135-1 and 135-2 add up outputs from two transmission low-pass filer frequency conversion units at the second stage to which each of the adders is connected and output addition results to the transmission low-pass filter frequency conversion units at the first stage to which the adders 135-1 and 135-2 are connected. The adder 137 adds up an output of the transmission low-pass filter frequency conversion unit 136-1 at the first stage and an output of the transmission low-pass filter frequency conversion unit 136-2 and outputs an addition result.

Figure 9:
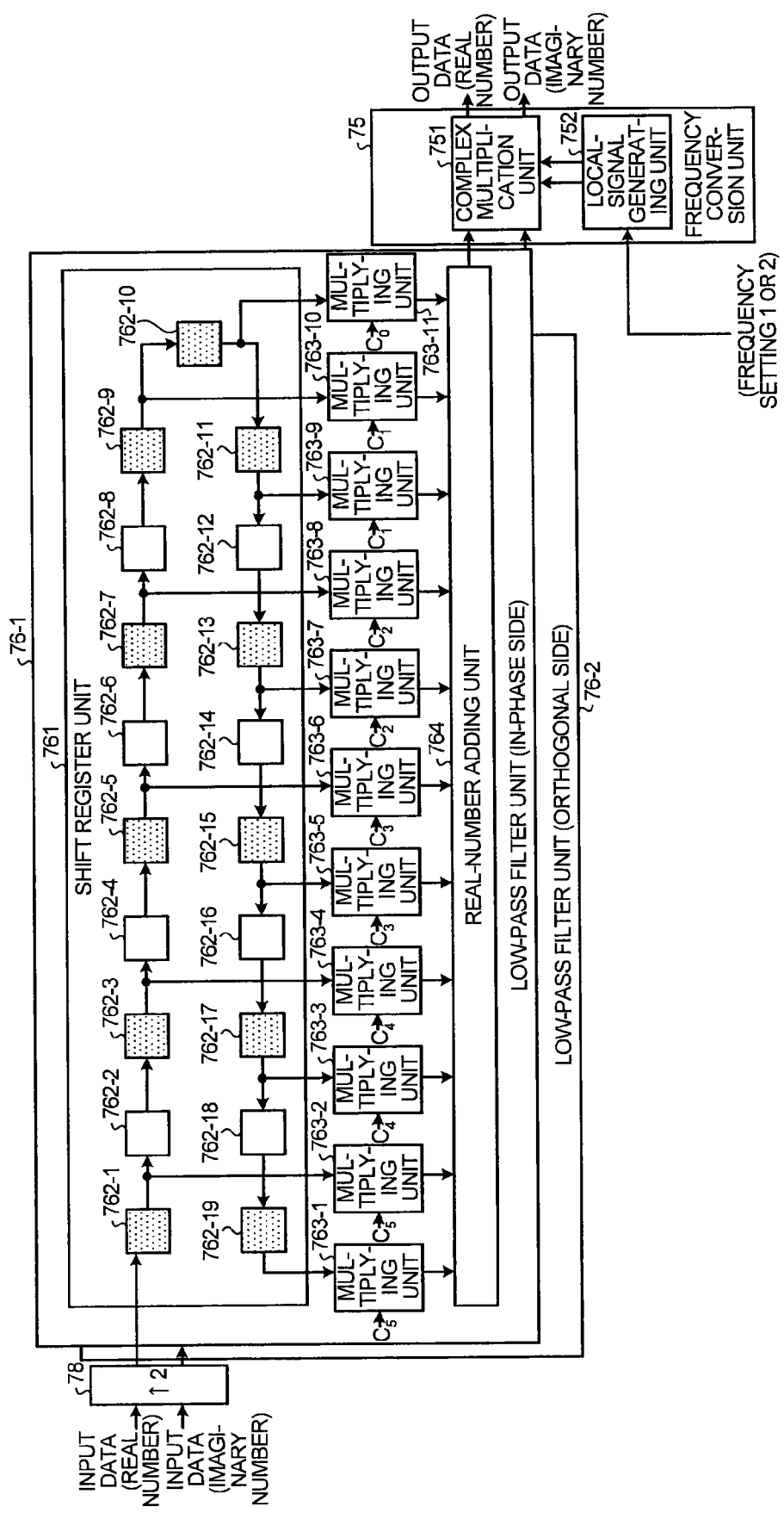
FIG. 9 is a diagram of a functional configuration example of a transmission low-pass filter frequency conversion unit.

FIG. 9 is a diagram of a functional configuration example of the transmission low-pass filter frequency conversion unit 132-1. The configuration of the transmission low-pass filter frequency conversion units 132-2 to 132-8, 134-1 to 134-4, and 136-1 and 136-2 is the same as the transmission low-pass filter frequency conversion unit 132-1. In the configuration shown in FIG. 9, the number of taps is nineteen.

The transmission low-pass filter frequency converting unit 132-1 includes an up-sampler unit (T2) 78 that up-samples input data (I, Q) to a double (i.e., inserts one zero between continuing input data), low-pass filter units 76-1 and 76-2, and a frequency conversion unit 75. The configurations of the low-pass filter units 76-1 and 76-2 and the frequency conversion unit 75 are respectively the same as the configurations of the low-pass filter units 76-1 and 76-2 and the frequency conversion unit 75 of the frequency conversion and reception low-pass filter unit 71-1.

Processing by the transmission low-pass filter frequency conversion unit 132-1 is explained. Processing by the transmission low-pass filter frequency conversion units 132-2 to 132-8, 134-1 to 134-4, and 136-1 and 136-2 is the same as the processing by the transmission low-pass filter frequency conversion unit 132-1.

Figure 10:
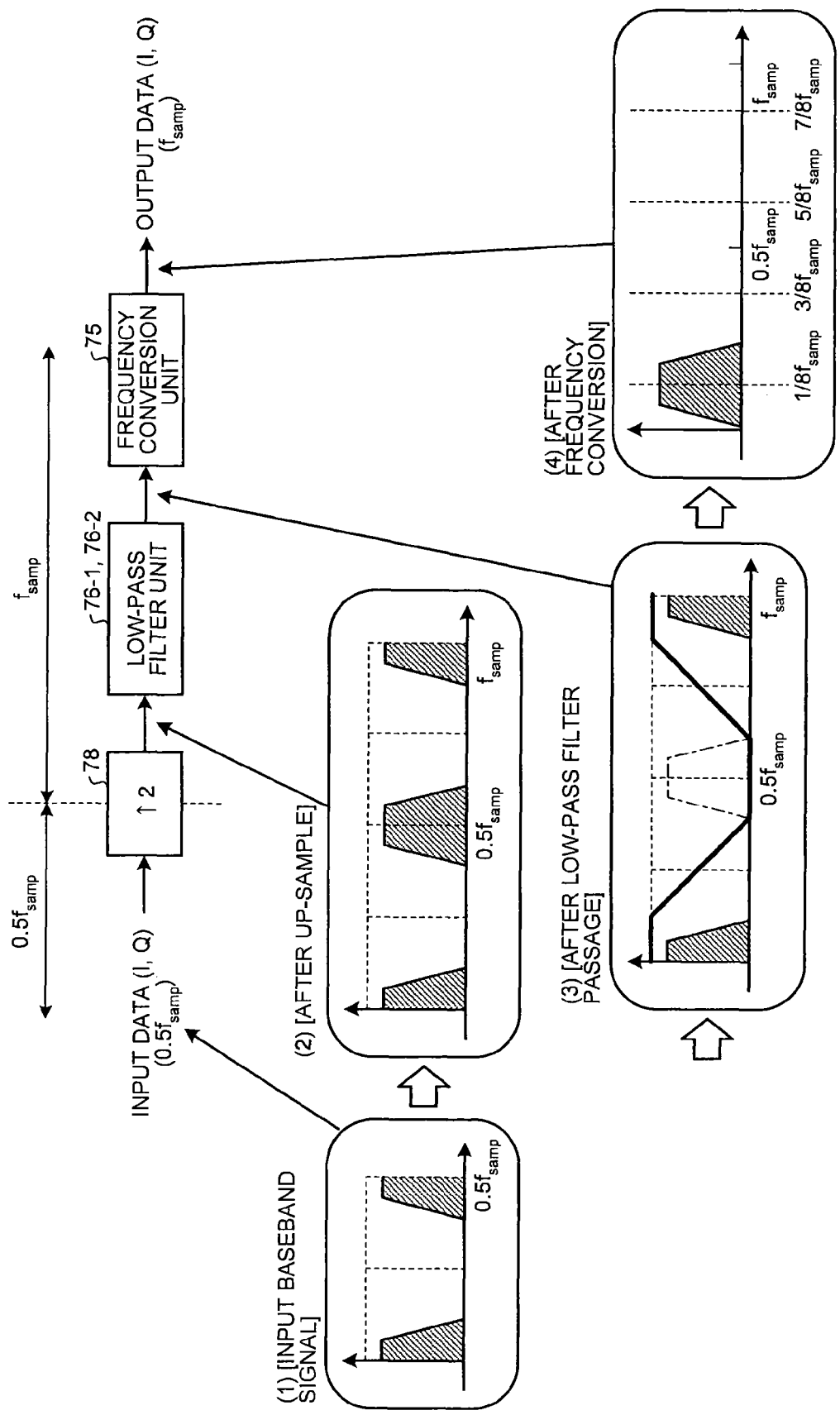
FIG. 10 is a diagram of an example of processing by the transmission low-pass filter frequency conversion unit.

FIG. 10 is a diagram of an example of the processing by the transmission low-pass filter frequency conversion unit 132-1. The transmission low-pass filter frequency conversion unit 132-1 offsets (shifts) the center frequency of an input signal while interpolating a sampling frequency ($0.5\,f_{samp}$) of the input signal to be a double sampling frequency ($=1.0\,f_{samp}$) ((2) in FIG. 10).

For example, when a signal (the bandwidth of the signal is $0.25\,f_{samp}$ in total, $0.125\,f_{samp}$ each on both sides) shown in (1) of FIG. 10 is input, the up-sampler unit 78 interpolates the double sampling frequency input signal to a double sampling frequency ((2) in FIG. 10). The low-pass filter units 76-1 and 76-2 perform filtering processing to allow a desired signal centering on 0 to pass ((3) in FIG. 10).

Subsequently, the frequency conversion unit 75 frequency-converts the input signal to offset (shift) the center frequency of the input signal by $+0.125\,f_{samp}$ or $-0.125\,f_{samp}$ ((4) in FIG. 10). An offset amount is set in advance. In this case, two transmission low-pass filter frequency conversion units that output processing results to the same adding unit (e.g., the transmission low-pass filter frequency conversion unit 132-1 and the transmission low-pass filter frequency conversion unit 132-2) respectively set offset amounts having different signs and the same absolute value (e.g., $+0.125\,f_{samp}$ for the transmission low-pass filter frequency conversion unit 132-1 and $-0.125\,f_{samp}$ for the transmission low-pass filter frequency converting unit 132-2).

Figure 11:
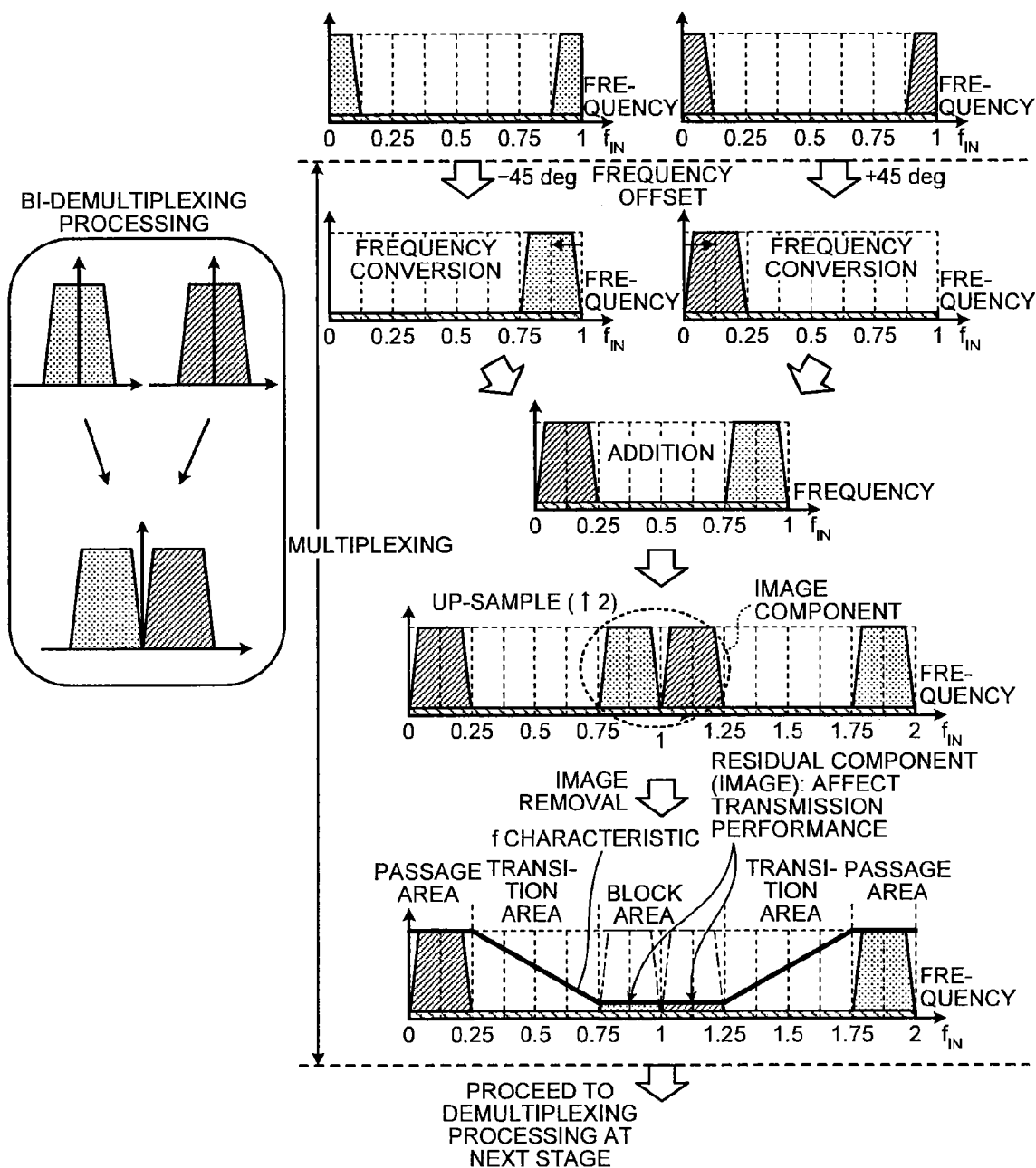
FIG. 11 is a diagram of an example of bi-multiplexing processing on a frequency axis.

FIG. 11 is a diagram of an example of bi-multiplexing processing on a frequency axis. In the multiplexing processing in this embodiment, addition processing for output signals of two transmission low-pass filter frequency conversion units at the same stage is added to the above "up-sample→low-pass filter→frequency conversion". Processing of "up-sample→low-pass filer→frequency conversion→addition→up-sample→low-pass filter→frequency conversion→addition . . . " is repeated until sampling speed after the up-sample reaches sampling speed of the D/A converter 14.

In FIG. 11, for example, the frequency conversion unit 75 of the transmission low-pass filter frequency conversion unit 131-1 shifts an input signal including a signal S1 after the up-sampling by $-0.125\,f_{samp}$ and the frequency conversion unit 75 of the transmission low-pass filter frequency conversion unit 131-2 shifts an input signal including an up-sampled signal S2 by $+0.125\,f_{samp}$. The adder 133-1 adds up an output signal of the transmission low-pass filter frequency conversion unit 131-1 after the shift and an output signal of the transmission low-pass filter frequency conversion unit 131-2 after the shift and outputs an addition result to the transmission low-pass filter frequency conversion unit 134-1.

The transmission low-pass filter frequency conversion unit 134-1 applies up-sampling to the input signal and then applies filtering to the signal.

Thereafter, as processing at the next stage, the frequency conversion unit 75 performs frequency conversion and the processing continues in the same manner. One stage of the multiplexing processing and the processing by one transmission low-pass filter frequency conversion unit do not correspond to each other. However, a break of the multiplexing processing at the first stage, which is an example, can be set anywhere.

When two signals are added up, for example, one is offset by $+0.125\,f_{samp}$ and the other is offset by $-0.125\,f_{samp}$. Consequently, the two signals to be added up do not overlap on the frequency axis. The multiplexing processing itself performed once (in one cycle) is equivalent to the existing method. Therefore, detailed explanation of the multiplexing processing is explained.

Figure 12:
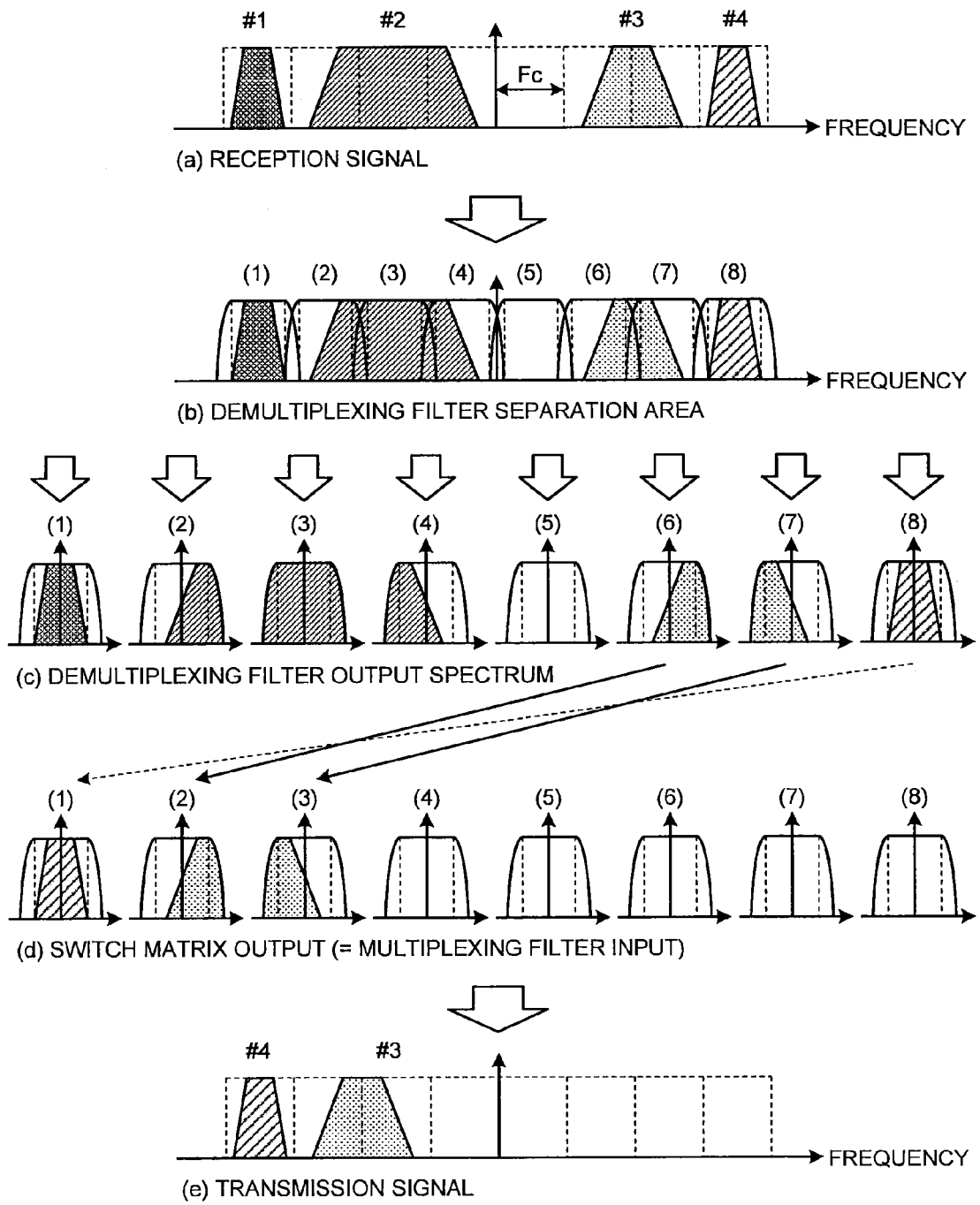
FIG. 12 is a diagram of an example of demultiplexing/ multiplexing processing during relay processing.

The operation of the relay apparatus according to this embodiment in performing relay processing is explained. The replay processing performed when an interference wave is absent is explained. First, demultiplexing processing in the relay processing is explained. FIG. 12 is a diagram of an example of demultiplexing and multiplexing processing during the relay processing.

As shown in (a) of FIG. 12, it is assumed that signals #1 to #4 in different bands are present in a reception signal. The signal #1, the signal #2, the signal #3, and the signal #4 are present in higher frequency bands in this order. As shown in (a) of FIG. 12, signal bands of the signal #1 and the signal #4 have minimum signal bandwidth (Bw) and fit in minimum channel width (Fc). A signal band of the signal #3 is 2 Bw and a signal band of the signal #2 is 3 Bw. An unused area for minimum channel width (Fc) is present between the signal #2 and the signal #3. System bandwidth (from a minimum frequency of the signal #1 to a maximum frequency of the signal #4) is 8 Fc in total including the unused area.

First, the A/D converter 6 samples the reception signal (band: 8 Fc) shown in (a) of FIG. 12 at a sampling frequency 32 Fc. The frequency conversion and reception low-pass filter unit 71-1 extracts a band including "the unused area, the signal #3, and the signal #4" and the frequency conversion and reception low-pass filter unit 71-2 extracts a band including "the signal #1 and the signal #2" according to the operation shown in FIG. 5.

Similarly, in the subsequent frequency conversion and reception low-pass filter units 72-1 to 72-4 and 73-1 to 73-8, processing for demultiplexing one input signal into two is performed stepwise by one set of (two) frequency conversion and reception low-pass filter units.

In a process of the demultiplexing processing, the input signal is demultiplexed into eight areas using the filter characteristics of the eight forms shown in (1) to (8) in (b) of FIG. 12. Actually, as explained above, because a frequency shifts, the respective areas are not arranged on the frequency axis as shown in (b) of FIG. 12. However, in (b) of FIG. 12, the demultiplexed signals are respectively arranged in original positions of the center frequency.

FIG. 13 is a diagram of an example of extraction target areas of the frequency conversion and reception low-pass filter units. In FIG. 13, an example of the extraction target area in the case of the demultiplexing shown in (b) of FIG. 12 is shown. For each of the frequency conversion and reception low-pass filter units at the respective stages, an area set as an extraction target by the frequency conversion and reception low-pass filter unit (an extraction area) is shown. Extraction areas are shown using the filter characteristics (1) to (8) shown in FIG. 12(b).

As shown in FIG. 13, an extraction area is divided into two according to an increase in a stage number. The demultiplexing processing is applied in a tournament (tree) format. Actually, a part of signal components on the right and left of the extraction areas shown in FIG. 13 is also extracted. However, the reception channel filter units 74-1 to 74-8 finally extract, only in desired areas, signals of the frequency conversion and reception low-pass filter units 73-1 to 73-8 at the third stage while performing waveform shaping using the amplitude to frequency characteristic (A(f)).

Spectra of the signals after the processing by the reception channel filter units 74-1 to 74-8 are shown in (c) of FIG. 12. As shown in (c) of FIG. 12, the signal #2 is separated into three ((2), (3), and (4)) and the signal #3 is separated into two ((6) and (7)).

According to a characteristic that a signal is demultiplexed into two and sampling speed is reduced to a half every time the signal passes the stage, the same frequency conversion and reception low-pass filter unit can be caused to operate in a time division manner in a stage unit. In this case, the frequency conversion and reception low-pass filter units can be configured in a number equivalent to the number of stages (in this embodiment, three).

The multiplexing processing in the relay processing is explained. The switch matrix unit 12 receives, as input signals, signals output from the reception channel filter units 74-1 to 74-8, selects a part or all of the input signals, changes the arrangement in the frequency direction, and outputs the signals. An example of an output of the switch matrix unit 12 is shown in (d) of FIG. 12. In the example shown in (d) of FIG. 12, signals in areas (6), (7), and (8) equivalent to the signal #4 and the signal #3 are selected. The selected signals are output with (8) rearranged to (1), (6) rearranged to (2), and (7) rearranged to (3). Signals are not input to excess output areas ((4), (5), (6), (7), and (8)) other than the areas. Such operation of the switch matrix unit 12 is controlled by the control and monitor unit 10.

The control and monitor unit 10 grasps, based on channel information (including frequency information of the signals included in the reception signal and information concerning a relay destination) acquired from the control station through a line separate from the main signal, a frequency configuration of the reception signal, correspondence between a relay destination area and a signal to be output, and the like. The control and monitor unit 10 outputs a clock control signal to the clock supplying unit 11 and outputs a path setting signal (a signal for setting which input is output to where) to the switch matrix unit 12. The clock control signal is a signal for controlling whether clocks are supplied to the components. The clock control signal is explained later.

The transmission channel filter units 131-1 to 131-8 perform waveform shaping and extraction of signals according to frequency characteristics same as the frequency characteristics of the reception channel filter units 74-1 to 74-8. When the digital demultiplexing unit 7 includes the reception channel filter units 74-1 to 74-8, the transmission channel filter units 131-1 to 131-8 are unnecessary. Specifically, in a process for relaying signals, channel filters only have to be provided before the multiplexing processing for demultiplexed signals is started. The channel filters can be set behind the last stage of the digital demultiplexing unit 7 or can be set before the first stage of the digital multiplexing unit 13.

As a measure for reducing a circuit size, both of the reception channel filter units 74-1 and 74-8 of the digital demultiplexing unit 7 and the transmission channel filter units 131-1 to 131-8 of the digital multiplexing unit 13 can be provided. The channel filter units can be configured such that a product of frequency characteristics of both the channel filters for each of channels is A(f) (e.g., the characteristics of Formulas (3) to (5)). In this case, a required number of taps 2 m (stages) in realizing a target attenuation characteristic using two channel filters is smaller than a required number of taps M (sages) in realizing the target attenuation characteristic using one channel filter (M>2 m). Therefore, an effect of a reduction in a circuit size is obtained.

Returning to the explanation of FIG. 12, as shown in (d) of FIG. 12, the signals rearranged by the switch matrix unit 12 are input to the digital multiplexing unit 13. In the digital multiplexing unit 13, the multiplexing processing explained above is carried out stepwise by the transmission low-pass filter frequency conversion units 132-1 to 132-8, 134-1 to 134-4, and 136-1 and 136-2 and the adders 133-1 to 133-4, 135-1 and 135-2, and 137.

When signal areas to be input to the multiplexing processing are assumed to be (1) to (8) (eight areas in total) shown in FIG. 12(*d*), target areas where the transmission low-pass filter frequency conversion units 132-1 to 132-8, 134-1 to 134-4, and the 136-1 and 136-2 and the adders 133-1 to 133-4, 135-1 and 135-2, and 137 perform the multiplexing are areas shown in FIG. 14.

FIG. 14 is a diagram of an example of the target areas where the transmission low-pass filter frequency conversion units 132-1 to 132-8, 134-1 to 134-4, and the 136-1 and 136-2 and the adders 133-1 to 133-4, 135-1 and 135-2, and 137 perform the multiplexing. In FIG. 14, multiplexing target areas covered by the transmission low-pass filter frequency conversion units and the adders at the respective stages are shown. As it is evident from FIG. 14, the multiplexing processing is applied in a tournament (tree) format for expanding multiplexing areas to a double according to a decrease in the number of stages.

In (e) of FIG. 12, signal spectra of signals output from the adder 137 are shown. According to the correspondence shown in FIG. 14, a signal in an area (1) including the signal #4 passes the transmission low-pass filter frequency conversion unit 131-8 and a signal in an area (2) including one component of the signal #3 passes the transmission low-pass filter frequency conversion unit 131-7. After being added up by the adder 133-4, both the signals after the passage are input to the transmission low-pass filter frequency conversion unit 134-4. On the other hand, a signal in an area (3) including the other component of the signal #3 is input to the transmission low-pass filter frequency conversion unit 134-3 after passing through the transmission low-pass filter frequency conversion unit 131-7 and the adder 133-3.

The adder 135-2 adds up the signals (the signals in the areas (1) and (2)) passed through the transmission low-pass filter frequency conversion unit 134-4 and the signal (the signal in the area (3)) passed through the transmission low-pass filter frequency conversion unit 134-3 and outputs an added-up signal to the transmission low-pass filter frequency conversion unit 136-1. In this way, a multiplexed signal including the signal #3 and the signal #4 is generated while the signal #3 is restored. The combined signal passes the transmission low-pass filter frequency conversion unit 136-1 and the adder 137. In this way, signals having spectra shown in (e) of FIG. 12 are output from the adder 137.

Thereafter, the D/A converter 14 subjects the multiplexed signal output from the adder 137 to digital-to-analog conversion and outputs the multiplexed signal as a transmission signal.

In an example explained here, the signals (the signal #3 and the signal #4) corresponding to (6) to (8) among the demultiplexed signals shown in (c) of FIG. 12 are input to the digital multiplexing unit 13 to correspond to one relay destination is shown. When a plurality of relay destinations are present, the digital multiplexing units 13 are provided by a number equivalent to the number of relay destinations. The switch matrix unit 12 outputs, for each of the relay destinations, a multiplexing target signal to the digital multiplexing unit 13 corresponding to the relay destination.

In the multiplexing processing explained in the example shown in FIG. 12, the signals do not pass through the transmission low-pass filter frequency conversion units 132-1 to 132-5, 134-1 and 134-2, and 136-1 and the adders 133-1 and 133-2 and 135-1. Therefore, the operations of these circuits can be stopped. In this embodiment, a reduction in power consumption is realized by stopping the supply of clocks to the circuits (the components) through which the signals do not pass.

Specifically, the control and monitor unit 10 determines, based on channel information acquired from the control station and the multiplexing target areas of the sections illustrated in FIG. 14, circuits, clock supply to which is stopped, and notifies the clock supplying unit 11 of a determination result with a clock control signal. The clock supplying unit 11 stops, continues, or starts the supply of a clock for each of the circuits based on the clock control signal. In this way, when total signal bandwidth to be subjected to multiplexing is a part of the system band, it is possible to realize a reduction in power consumption by stopping the clock supply to the circuits not used for the multiplexing processing.

For example, when it is assumed that the relay apparatus according to this embodiment is mounted on a multi-beam satellite, beam areas of multiple beams are usually repetition of seven cycles, and a band of 1/7 of a system band per one beam area is set as a multiplexing target, it is possible to stop the clock supply to the circuits in about 6/7 of the band. Therefore, it is possible to reduce power consumption of the digital multiplexing unit 13 in this case to 1/7.

Figure 15:
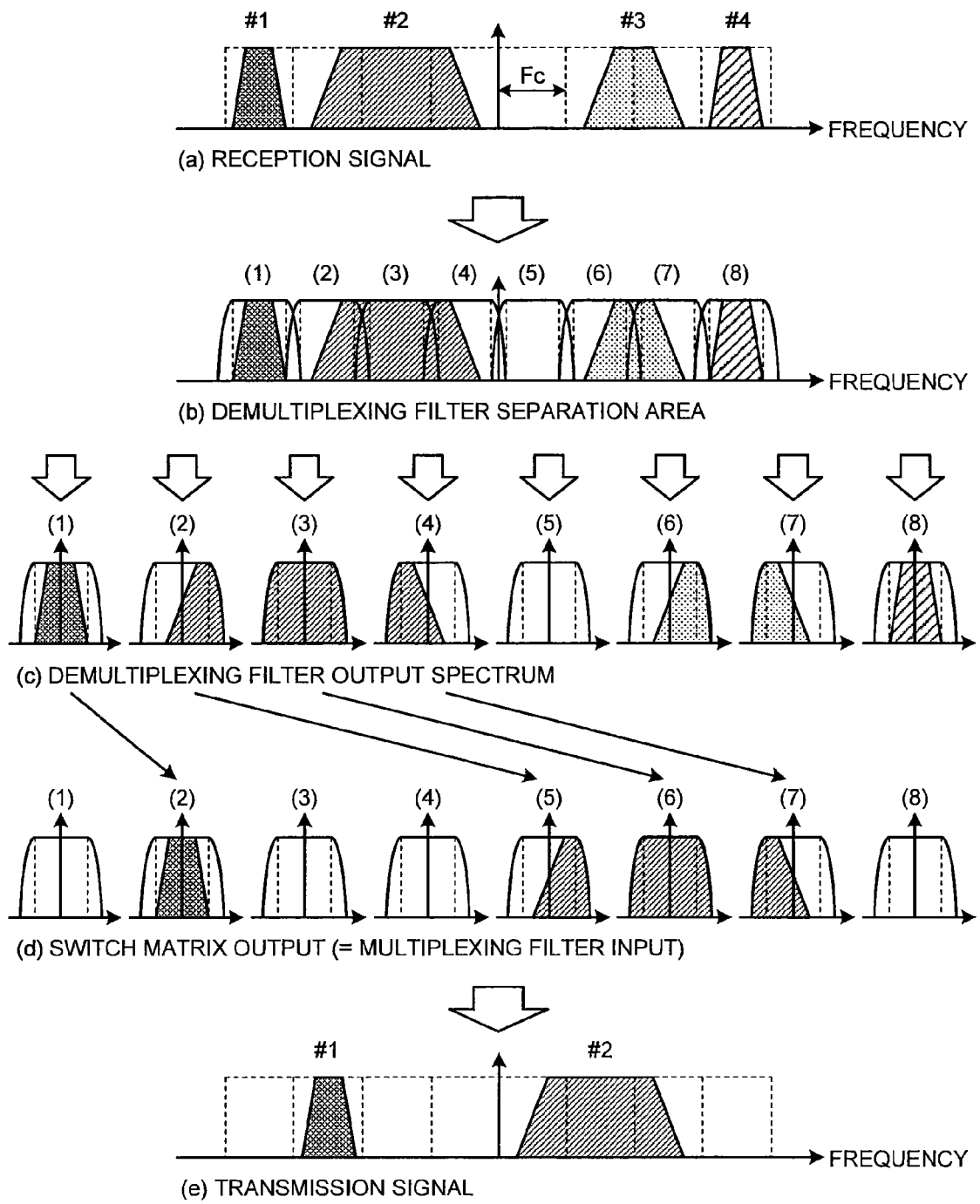
FIG. 15 is a diagram of another example of the demultiplexing/multiplexing processing.

FIG. 15 is a diagram of another example of the demultiplexing and multiplexing processing. In the example shown in FIG. 15, the signal #1 and the signal #2 are targets of multiplexing. (a) to (c) of FIG. 15 are the same as (a) to (c) of FIG. 12. In the example shown in FIG. 15, the switch matrix unit 12 rearranges, in the frequency direction, the areas ((1), (2), (3), and (4)) equivalent to the signals #1 and #2 among the signals demultiplexed by the digital demultiplexing unit 7 ((1)→(2), (2)→(5), (3)→(6), and (4)→(7)) and outputs the signals.

The signals #2 separated into three are restored at a point when the signals #2 pass the adder 135-1 at the second stage. After passing through the transmission low-pass filter frequency conversion unit 136-1, the signals #2 are multiplexed with the signal #1 passed through the transmission low-pass filter frequency conversion unit 136-2. A multiplexed signal shown in (e) of FIG. 15 is generated. In this case, signals do not pass through the transmission low-pass filter frequency conversion units 132-1, 132-5, 132-6, 132-8, and 134-3 and the adder 133-3. Therefore, clock supply to these circuits can be stopped.

In the process of the multiplexing processing, the signals #2 do not always have to be multiplexed to the original shape of the signal #2 and restored. For example, when three unused bands on the transmission side are present adjacent to one another or when the three unused areas are scattered, the demultiplexed signals #2 ((2), (3), and (4) in (c) of FIG. 15) can be transmitted using discontinuous three unused bands. In this case, the signals #2 are restored on the receiver side by demultiplexing and multiplexing with a configuration corresponding to frequency allocation on the transmission side. In this way, when a signal having large bandwidth is transmitted, effective usability of frequencies is improved by allowing transmission in discontinuous frequency bands.

The method of realizing a reduction in power consumption through the stop of the clock supply when the total signal bandwidth to be subjected to multiplexing is a part of the system band is explained above. Similarly, when the total signal bandwidth to be subjected to demultiplexing is a part of the system band during demultiplexing, a reduction in power consumption can be realized by stopping the clock supply to circuits not used for the demultiplexing processing.

In this case, the control and monitor unit 10 determines, based on channel information and the extraction areas of the units illustrated in FIG. 13, circuits through which signals do not pass (the frequency conversion and reception low-pass filter units and the reception channel filter units) and notifies the clock supplying unit 11 of a determination result as a clock control signal. The clock supplying unit 11 stops, continues, or starts clock supply to the units based on the clock control signal.

Specifically, for example, in the examples shown in FIGS. 12 and 15, a signal in an unused area (corresponding to the area (5)) passes through the frequency conversion and reception low-pass filter unit 71-1, the frequency conversion and reception low-pass filter unit 72-2, and the frequency conversion and reception low-pass filter unit 73-4. The frequency conversion and reception low-pass filter unit 71-1 and the frequency conversion and reception low-pass filter unit 72-2 cannot be stopped because the frequency conversion and reception low-pass filter unit 71-1 and the frequency conversion and reception low-pass filter unit 72-2 process signals in other bands. However, the frequency conversion and reception low-pass filter unit 73-4 can be stopped because the frequency conversion and reception low-pass filter unit 73-4 corresponds to only the area (5). Therefore, the clock supply to the frequency conversion and reception low-pass filter unit 73-4 can be stopped. The clock supply to the reception channel filter unit 74-4 connected to the frequency conversion and reception low-pass filter unit 73-4 can also be stopped.

The stop of the clock supply to the circuits not used during the demultiplexing processing and the multiplexing processing by the clock control signal explained above is not essential. Only the stop of the clock supply to the circuits not used in one of the demultiplexing processing and the multiplexing processing can be carried out or the stop of the clock supply to the circuits not used in both of the demultiplexing processing and the multiplexing processing can be not carried out.

In the above explanation of the relay processing, the demultiplexed signal input to the switch matrix unit 12 is explained as the signal output from the digital demultiplexing unit 7. Actually, in the relay apparatus according to this embodiment, the signal output from the digital demultiplexing unit 7 is input to the switch matrix unit 12 through the interference-wave suppressing unit 9 as explained above. The interference-wave suppressing unit 9 performs processing for changing a band in which an interference wave is present to a null signal. However, because a channel configuration is not changed, processing by the switch matrix is the same.

As explained above, in this embodiment, the digital demultiplexing unit 7 carries out interference suppression processing for demultiplexing a reception signal into a signal in each of channels of predetermined bandwidth and, when an average power value of the demultiplexed signal exceeds a predetermined threshold, changing the demultiplexed signal in the channel to a null signal. The digital demultiplexing unit 7 multiplexes and transmits signals after the interference suppression processing. Therefore, even when an interference wave is added to a relay-target reception signal, it is possible to secure communication quality and suppress wasteful power consumption during relay.

Further, in this embodiment, in the process of performing the demultiplexing processing, clocks are not supplied to the circuits that perform processing of bands through which signals do not pass, and the circuits are stopped. Consequently, it is possible to realize a reduction in power consumption while realizing demultiplexing for a plurality of signals having various bandwidths. In the process of performing the multiplexing, clocks are not supplied to the circuits that perform processing of bands through which signals do not pass, and the circuits are stopped. Consequently, it is possible to realize a reduction in power consumption while realizing multiplexing for a plurality of signals having various bandwidths.

Second Embodiment

FIG. 16 is a diagram of an example of interference suppression processing in a second embodiment. The configuration of a relay apparatus according to this embodiment is the same as the relay apparatus according to the first embodiment. In this embodiment, interference wave prevention processing in a relay system including a relay apparatus same as the relay apparatus according to the first embodiment and a ground station or a control station, which is a base station, is explained. Differences from the first embodiment are explained below.

It is assumed that, as shown in (a) of FIG. 16, three interference waves are present in a band of a reception signal and one of the interference waves overlaps a desired main signal (principal wave). The relay apparatus according to this embodiment performs interference suppression processing explained below to thereby prevent the interference waves and restore the original principal wave while minimizing a frequency in use.

(A) The relay apparatus according to this embodiment receives a signal shown in (a) of FIG. 16, detects the three interference waves shown in (a) of FIG. 16 according to processing by the digital demultiplexing unit 7 and the interference-wave detecting unit 8 same as the processing in the first embodiment and notifies a control station (a ground station, a base station, etc.) of a detection result through the control and monitor unit 10 using another line.

(B) As shown in (b) of FIG. 16, the control station copies, based on the detection result of the interference waves notified from the relay apparatus according to this embodiment, a signal in an area (a portion indicated by a circle) corresponding to a channel overlapping the interference wave in the principal wave and transmits the copied signal using another free band. This copy processing can be realized by providing a digital demultiplexing unit, a switch matrix unit, and a digital multiplexing unit same as those of the relay apparatus according to this embodiment in a transmitting apparatus of the control station. For example, in the transmitting apparatus of the control station, after the principal wave is digital-demultiplexed into four channels by the digital demultiplexing unit, one of demultiplexed signals of the principal wave (a signal in a band in which the interference wave is detected) is copied. A switch matrix unit of the transmitting apparatus rearranges the copied signal to be arranged in a band in which the interference wave is absent. Thereafter, signals in five channels in total including the original principal wave and the copied channels are digital-multiplexed. The control station can perform transmission in a copied channel shown in (b) of FIG. 16 according to such an operation. The control station notifies, using a line separated from the principal wave, the relay apparatus of a state of use of channels including the copied channel as channel information.

(C) Subsequently, the relay apparatus according to this embodiment receives the signal including the copied channel transmitted by the processing in (B) above. The digital demultiplexing unit 7 separates a reception signal into eight channels as shown in (b) of FIG. 16 as in the first embodiment. As in (A) above, the interference-wave detecting unit 8 detects the three interference waves and notifies the control station of a detection result using the other line. As in the first embodiment, the interference-wave suppressing unit 9 inputs three channels in which the interference waves are detected (corresponding to (3), (6), and (8) in (b) of FIG. 16) to the switch matrix unit 12 as a null signal. In the other channels, the interference-wave suppressing unit 9 directly inputs an output from the digital demultiplexing unit 7 to the switch matrix unit 12.

(D) The control and monitor unit 10 instructs, based on channel information notified from the control station, a path (a relation between an input and an output) of the switch matrix unit 12. The switch matrix unit 12 outputs, based on the instruction, the signal of the copied channel to the digital multiplexing unit 13 instead of the channel (3) in which the interference wave is present. For example, the switch matrix unit 12 outputs signals of channels (1), (2), (7), and (4) to the digital multiplexing unit 13 in an arrangement shown in (e) of FIG. 16.

(E) As in the first embodiment, the digital multiplexing unit 13 can reproduce the original principal wave by multiplexing the signals of the channels (1), (2), (7), and (4). Operations in this embodiment other than the operations explained above are the same as the operations in the first embodiment.

As explained above, in this embodiment, the control station copies, based on the information concerning the interference waves detected by the relay apparatus same as the relay apparatus according to the first embodiment, the signal in the channel affected by the interference waves and transmits the copied signal using another free band. The relay apparatus performs the multiplexing processing using the copied signal rather than the channel affected by the interference wave to thereby restore the principal wave originally desired to be received.

As a measure for preventing the influence of the interference waves in the past, there is frequency diversity for simultaneously transmitting the principal wave at two frequencies. However, in the transmitting method according to this embodiment, signal bands in use are not doubled unlike the frequency diversity. The used bands only increase by the number of channels affected by the interference waves. Therefore, effects same as the effects in the first embodiment can be obtained and effective use of frequencies can be realized. For example, in the example shown in FIG. 16, it is possible to suppress an increase in signal bands in use to 5/4, prevent the influence of the interference waves, and secure satisfactory communication quality.

In the frequency diversity in the past, two or more complete free bands equivalent to the band of the principal wave are necessary. When the complete free bands cannot be secured, the frequency diversity in the past cannot be applied. For example, when the two interference waves are present in the free bands as well, because the complete free bands cannot be secured, the frequency diversity in the past cannot be applied. On the other hand, in the relay system according to this embodiment, the complete free bands are unnecessary. The free areas can be scattered as long as free bands equivalent to channels affected by the interference waves can be secured. Even when only the scattered free areas are present, it is possible to realize interference prevention. Therefore, resistance against the number of occurrences of interference waves is higher than the frequency diversity in the past.

INDUSTRIAL APPLICABILITY

As explained above, the interference wave suppressing apparatus, the relay apparatus, the relay system, and the interference wave suppressing method according to the present invention are useful for a relay apparatus that suppresses interference waves included in a reception signal and are, in particular, suitable for a relay apparatus requested to suppress power consumption.

REFERENCE SIGNS LIST

1 Antenna
2 Voltage-Controlled Gain Variable Amplifier
3 Mixer
4 Local Oscillator
5 LPF
6 A/D 7 Digital Demultiplexing Unit
8 Interference-Wave Detecting Unit
9 Interference-Wave Suppressing Unit
10 Control and Monitor Unit
11 Clock Supplying Unit
12 Switch Matrix Unit
13 Digital Multiplexing Unit
14 D/A
71-1, 71-2, 72-1 To 72-4, 73-1 To 73-8 FC+RXHBF
74-1 to 74-8, 131-1 to 131-8 CFilter
75 Frequency Conversion Unit
76-1, 76-2 Low-Pass Filter Units
77 Down-Sampler Unit
78 Up-Sampler Unit
81, 86 Power Conversion Units
82, 87 Averaging Units
83 Comparing Unit
84 Integrating Unit
85 Voltage Conversion Unit
88 Comparing and Determining Unit
132-1 to 132-8, 134-1 to 134-4, 136-1, 136-2 TXHBF+FC
133-1 to 133-4, 135-1, 135-2, 137 Adders
S1, S2, S3 Signals

The invention claimed is:

1. An interference wave suppressing apparatus comprising:
a demultiplexing unit configured to demultiplex a reception signal into a plurality of separate demultiplexed signals, each having predetermined bandwidth;
an interference-wave detecting unit configured to determine, for each of the plurality of separate demultiplexed signals, based on a power value thereof, whether an interference wave is present;
an interference-wave suppressing unit configured to change a signal value of one of the separate demultiplexed signals, in which the interference-wave detecting unit determines that an interference wave is present, to a value equal to or smaller than a predetermined value, output the one of the separate demultiplexed signals after the change, and also output the others of the plurality of separate demultiplexed signals, in which the interference-wave detecting unit determines that an interference wave is absent; and
a multiplexing unit configured to output a multiplexed signal obtained by multiplexing signals output from the interference-wave suppressing unit, wherein
the demultiplexing unit is configured to demultiplex the reception signal into the demultiplexed signals according to demultiplexing processing at N (N is an integer equal to or larger than 1) stages,
two or more frequency conversion filter units configured to perform frequency conversion to shift a center frequency of an input signal by a predetermined frequency, extract a signal in a predetermined band from the signal after the frequency conversion, perform down-sampling processing of the extracted signal, and output the signal after the down-sampling,
a channel filter configured to apply waveform shaping to each signal after processing by the frequency conversion filter unit at a final stage, and
the channel filter performs the waveform shaping so that the signal after waveform shaping has a channel characteristic in that each channel has a portion overlapping an adjacent channel in a frequency direction and a sum of both amplitude of overlapping areas between the channel and the adjacent channel is 1.

2. The interference wave suppressing apparatus according to claim 1, wherein, when an average of power values of the plurality of separate demultiplexed signals exceeds a predetermined threshold, the interference-wave detecting unit determines that an interference wave is present.

3. The interference wave suppressing apparatus according to claim 1, wherein the interference-wave suppressing unit changes a signal value of the one of the plurality of separate demultiplexed signals, in which the interference-wave detecting unit determines that an interference wave is present, to zero.

4. The interference wave suppressing apparatus according to claim 1, further comprising:
an amplifying unit configured to amplify the reception signal; and
an automatic gain control unit configured to control a gain of amplification in the amplifying unit based on power of the reception signal.

5. The interference wave suppressing apparatus according to claim 1, wherein
the demultiplexing unit includes frequency conversion filter units configured to perform frequency conversion to shift a center frequency of an input signal by a predetermined frequency, extract a signal in a predetermined band from the signal after the frequency conversion, perform down-sampling processing for reducing a sampling frequency of the extracted signal, and output the signal after the down-sampling, the demultiplexing unit including a pair of the frequency conversion filter units at a first stage and including, at a second and subsequent stages, the frequency conversion filter units twice as many as the frequency conversion filter units at the preceding stage,
the channel filter applies waveform shaping to a signal after processing by the frequency conversion filter unit at a final stage.

6. The interference wave suppressing apparatus according to claim 1, wherein
the demultiplexing unit includes frequency conversion filter units configured to perform frequency conversion to shift a center frequency of an input signal by a predetermined frequency, extract a signal in a predetermined band from the signal after the frequency conversion, perform down-sampling processing for reducing a sampling frequency of the extracted signal, and output the signal after the down-sampling, the demultiplexing unit including a singularity of the frequency conversion filter unit for each of stages, and
the frequency conversion filter units change, in a time division manner, a frequency to be shifted by the frequency conversion.

7. The interference wave suppressing apparatus according to claim 6, further comprising a channel filter configured to apply waveform shaping to a signal after processing by the frequency conversion filter unit at a final stage.

8. The interference wave suppressing apparatus according to claim 5, further comprising:
a control monitor unit configured to determine the frequency conversion filter unit, which does not perform processing, based on a use band of a main signal included in the reception signal and instruct, with a clock control signal, a stop of clock supply to the determined frequency conversion filter unit; and
a clock supplying unit configured to stop the clock supply based on the clock control signal.

9. The interference wave suppressing apparatus according to claim 1, wherein the multiplexing unit generates the multiplexed signal by subjecting the reception signal to multiplexing processing at M (M is an integer equal to or larger than 1) stages, the multiplexing unit includes:
  filter frequency conversion units configured to perform up-sampling processing to increase a sampling frequency of an input signal, extract a signal in a predetermined band from the signal after the up-sampling processing, and perform frequency conversion to shift a center frequency of the extracted signal by a predetermined frequency, the multiplexing unit including $2^M$ units of the filter frequency conversion units at a first stage and including, at a second and subsequent stages, the filter frequency conversion units twice as many as the filter frequency conversion units at the preceding stage; and
  an adding unit configured to add up signals output from a pair of the filter frequency conversion units at a same stage and output an addition result to the filter frequency conversion unit at a post stage, and
  in the two filter frequency conversion units that output the signals to be added up by the adding unit, a frequency to be shifted by the frequency conversion is set to values different from each other.

10. The interference wave suppressing apparatus according to claim 8, wherein
the multiplexing unit generates the multiplexed signal by subjecting the reception signal to multiplexing processing at M (M is an integer equal to or larger than 1) stages, the multiplexing unit includes:
  filter frequency conversion units configured to perform up-sampling processing to increase a sampling frequency of an input signal, extract a signal in a predetermined band from the signal after the up-sampling processing, and perform frequency conversion to shift a center frequency of the extracted signal by a predetermined frequency, the multiplexing unit including $2^M$ units of the filter frequency conversion units at a first stage and including, at a second and subsequent stages, the filter frequency conversion units twice as many as the filter frequency conversion units at the preceding stage; and
  an adding unit configured to add up signals output from a pair of the filter frequency conversion units at a same stage and output an addition result to the filter frequency conversion unit at a post stage, and
  in the two filter frequency conversion units that output the signals to be added up by the adding unit, a frequency to be shifted by the frequency conversion is set to values different from each other.

11. The interference wave suppressing apparatus according to claim 9, further comprising:
a control monitor unit configured to determine the filter frequency conversion unit, which does not perform processing, based on a use band of a main signal included in the reception signal and instruct, with a clock control signal, a stop of clock supply to the determined filter frequency conversion unit; and
a clock supplying unit configured to stop the clock supply based on the clock control signal.

12. The interference wave suppressing apparatus according to claim 1, wherein
the multiplexing unit generates the multiplexed signal by subjecting the reception signal to multiplexing processing at M (M is an integer equal to or larger than 1) stages, the multiplexing unit includes filter frequency conversion units configured to perform up-sampling processing to increase a sampling frequency of an input signal, extract a signal in a predetermined band from the signal after the up-sampling processing, and perform frequency conversion to shift a center frequency of the extracted signal by a predetermined frequency, the multiplexing unit including a singularity of the filter frequency conversion unit for each of stages, and
the filter frequency conversion units change, in a time division manner, a frequency to be shifted by the frequency conversion.

13. The interference wave suppressing apparatus according to claim 1, wherein
two or more band signals in a known frequency band are included in the reception signal as main signals, and
the multiplexing unit multiplexes the plurality of separate demultiplexed signals corresponding to the band signals in a frequency band exceeding the predetermined bandwidth among the band signals to be adjacent to or not to be adjacent to each other on a frequency axis.

14. A relay apparatus comprising:
a demultiplexing unit configured to demultiplex a reception signal into a plurality of separate demultiplexed signals, each having predetermined bandwidth;
an interference-wave detecting unit configured to determine, for each of the plurality of separate demultiplexed signals, based on a power value thereof, whether an interference wave is present;
an interference-wave suppressing unit configured to change a signal value of one of the plurality of separate demultiplexed signals, in which the interference-wave detecting unit determines that an interference wave is present, to a value equal to or smaller than a predetermined value, output the one of the plurality of separate demultiplexed signals after the change, and output the others of the plurality of separate demultiplexed signals, in which the interference-wave detecting unit determines that an interference wave is absent; and
a multiplexing unit configured to output a multiplexed signal obtained by multiplexing signals output from the interference-wave suppressing unit, wherein
the relay apparatus sets the multiplexed signal as a transmission signal to be transmitted to a relay destination,
the demultiplexing unit is configured to demultiplex the reception signal into the demultiplexed signals according to demultjplexing processing at N (N is an integer equal to or larger than 1) stages,
two or more frequency conversion filter units configured to perform frequency conversion to shift a center frequency of an input signal by a predetermined frequency, extract a signal in a predetermined band from the signal after the frequency conversion, perform down-sampling processing of the extracted signal, and output the signal after the down-sampling,
a channel filter configured to apply waveform shaping to each signal after processing by the frequency conversion filter unit at a final stage, and
the channel filter performs the waveform shaping so that the signal after waveform shaping has a channel characteristic in that each channel has a portion overlapping an adjacent channel in a frequency direction and a sum of both amplitude of overlapping areas between the channel and the adjacent channel is 1.

15. The relay apparatus according to claim 14, wherein
the relay apparatus sets a pair or more of the relay destinations,
the relay apparatus includes the multiplexing unit for each of the relay destinations, and the relay apparatus further comprises a switch matrix configured to output a signal, which is output from the interference-wave suppressing unit, to the multiplexing unit corresponding to the relay destination of the signal.

16. The relay apparatus according to claim 14, wherein
the relay apparatus sets two or more transmission sources of the reception signals,
the relay apparatus includes the demultiplexing unit for each of the transmission sources, and
the relay apparatus further comprises a switch matrix configured to output a signal, which is output from the interference suppressing unit, to the multiplexing unit.

17. The relay apparatus according to claim 14, wherein
the relay apparatus sets a pair or more of the relay destinations and sets two or more transmission sources of the reception signal,
the relay apparatus includes the multiplexing unit for each of the relay destinations,
the relay apparatus includes the demultiplexing unit for each of the transmission sources, and
the relay apparatus further comprises a switch matrix configured to output a signal, which is output from the interference-wave suppressing unit, to the multiplexing unit corresponding to the relay destination of the signal.

18. A relay system comprising:
the relay apparatus according to claim 14; and
a control station configured to transmit a signal to be relayed by the relay apparatus.

19. The relay system according to claim 18, wherein
the relay apparatus notifies the control station of a result of determination whether an interference wave is present in each of the plurality of separate demultiplexed signals,
the control station copies, based on the notification from the relay apparatus, a signal in a band corresponding to the one of the plurality of separate demultiplexed signals, in which it is determined that an interference wave is present, in a main signal as a copied signal, transmits the copied signal using a frequency band other than the band, in which it is determined that an interference wave is present, and notifies the relay apparatus that the copy signal is transmitted, and
the relay apparatus multiplexes, based on the notification from the control station, the signal in the band of the copy signal corresponding to the one of the plurality of separate demultiplexed signals instead of the one of the plurality of separate demultiplexed signals, in which it is determined that an interference wave is present.

20. The relay system according to claim 18, wherein
the relay apparatus is mounted on an artificial satellite, and
the control station is a ground station.

21. The relay system according to claim 18, wherein
the relay system is a relay system in a mobile communication system, and
the control station is a base station.

22. An interference wave suppressing method comprising:
a demultiplexing step of demultiplexing a reception signal into a plurality of separate demultiplexed signals, each having predetermined bandwidth;
a filtering step of applying waveform shaping to each of the plurality of separate demultiplexing signals in the demultiplexing step;
an interference-wave detecting step of determining, for each of the plurality of separate demultiplexed signals, based on a power value thereof whether an interference wave is present;
an interference-wave suppressing step for changing a signal value of one of the plurality of separate demultiplexed signals, in which it is determined in the interference-wave detecting step that an interference wave is present, to a value equal to or smaller than a predetermined value, outputting the one of the plurality of separate demultiplexed signals after the change, and also outputting the others of the plurality of separate demultiplexed signals, in which the it is determined that an interference wave is absent; and
a multiplexing step of outputting a multiplexed signal obtained by multiplexing signals output in the interference-wave suppressing step, wherein
the demultiplexing step is performed by two or more frequency conversion filter units configured to perform frequency conversion to shift a center frequency of an input signal by a predetermined frequency, extract a signal in a predetermined band from the signal after the frequency conversion, perform down-sampling processing of the extracted signal, and output the signal after the down-sampling, and
in the filtering step, the waveform shaping is performed so that the signal after waveform shaping has a channel characteristic in that each channel has a portion overlapping an adjacent channel in a frequency direction and a sum of both amplitude of overlapping areas between the channel and the adjacent channel is 1.

* * * * *